US007209555B2

(12) United States Patent
Futa et al.

(10) Patent No.: US 7,209,555 B2
(45) Date of Patent: Apr. 24, 2007

(54) ELLIPTIC CURVE CONVERTING DEVICE, ELLIPTIC CURVE CONVERTING METHOD, ELLIPTIC CURVE UTILIZATION DEVICE AND ELLIPTIC CURVE GENERATING DEVICE

(75) Inventors: Yuichi Futa, Osaka (JP); Motoji Ohmori, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 886 days.

(21) Appl. No.: 10/278,914

(22) Filed: Oct. 24, 2002

(65) Prior Publication Data
US 2003/0081771 A1    May 1, 2003

(30) Foreign Application Priority Data
Oct. 25, 2001 (JP) .............................. 2001-327337

(51) Int. Cl.
*H04K 1/00* (2006.01)
*H04L 9/00* (2006.01)
(52) U.S. Cl. ........................................................ 380/28
(58) Field of Classification Search .................... None
See application file for complete search history.

(56) References Cited

U.S. PATENT DOCUMENTS

| 5,497,423 | A | | 3/1996 | Miyaji et al. | |
|---|---|---|---|---|---|
| 6,088,453 | A | * | 7/2000 | Shimbo | 380/28 |
| 6,212,277 | B1 | * | 4/2001 | Miyaji | 380/30 |
| 6,782,100 | B1 | * | 8/2004 | Vanstone et al. | 380/28 |
| 6,816,594 | B1 | * | 11/2004 | Okeya | 380/59 |
| 2002/0044649 | A1 | * | 4/2002 | Gallant et al. | 380/30 |
| 2002/0057796 | A1 | * | 5/2002 | Lambert et al. | 380/28 |

FOREIGN PATENT DOCUMENTS

| EP | 0 940 944 | | 9/1999 |
|---|---|---|---|
| EP | 1 215 642 | | 6/2002 |
| JP | 11-316542 | | 11/1999 |
| WO | WO 99/30458 | * | 6/1999 |
| WO | 00/14924 | | 3/2000 |
| WO | 01/18772 | | 3/2001 |

OTHER PUBLICATIONS

J.-M. Courveignes, L. Dewaghe, F. Morain: "*Isogeny Cycles and the Schoof-Elkies-Atkin Algorithm*", LIX/RR/96/03, 'Online!, Aug. 30, 1996, pp. 1-19, XP002336157.

* cited by examiner

*Primary Examiner*—Christopher Revak
(74) *Attorney, Agent, or Firm*—Wenderoth, Lind & Ponack, L.L.P.

(57) ABSTRACT

An elliptic curve converting device that converts a first elliptic curve defined on a finite field F into a second elliptic curve defined on the finite field F comprises: an elliptic curve generating unit 210 that searches an elliptic curve that satisfies a speeding-up condition that reduces calculation quantity of arithmetic on the elliptic curve among a group of isogenous elliptic curves of degree $L_1$ that is a group of elliptic curves that has the same order as and a certain relationship with the first elliptic curve; an elliptic curve condition judgment unit 220 that judges whether the elliptic curve that satisfies the speeding-up condition is searched or not by the elliptic curve generating unit 210; and an elliptic curve output unit 230 that outputs an elliptic curve in the case that the elliptic curve condition judgment unit 220 judges that the elliptic curve that satisfies the speeding-up condition is searched.

23 Claims, 12 Drawing Sheets

ELLIPTIC CURVE CONVERTING DEVICE, ELLIPTIC CURVE CONVERTING METHOD, ELLIPTIC CURVE UTILIZATION DEVICE AND ELLIPTIC CURVE GENERATING DEVICE

BACKGROUND OF THE INVENTION (1) Field of the Invention

The present invention relates to encryption technology as information security technology and especially to secret communication, digital signature and key-sharing technology using an elliptic curve.

(2) Description of the Prior Art

1. Public-key Encryption

Recently, data communication based on computer technology and communication technology has become widely available, and in this data communication, a secret communication mode or a digital signature mode is used. Here, the secret communication mode is a mode to communicate without leaking communication contents to a person other than the other specified party of the communication. Moreover, the digital signature mode is a mode that shows the correctness of communication contents to the other party of the communication and certifies the identity of the originator.

In the secret communication mode or digital signature mode, an encryption mode called a public-key encryption is used. The public-key encryption is a mode to easily manage encryption keys that are different for each of the other parties of the communication when there are a plurality of other parties of the communication, and is an indispensable fundamental technology to communicate with the plurality of other parties of the communication. In the secret communication using the public-key encryption, an encryption key and a decryption key are different, wherein the decryption key is secret and the encryption key is public.

As a base of security of this public-key encryption, a discrete logarithm problem is used. As for the discrete logarithm problem, there are what is defined on a finite field and what is defined on an elliptic curve as representatives. Moreover, the discrete logarithm problem is described in detail in "A Course in Number theory and Cryptography" by Neal Koblitz, Springer-Verlag, 1987.

2. The Discrete Logarithm Problem on an Elliptic Curve

The discrete logarithm problem on an elliptic curve is described below. The discrete logarithm problem on the elliptic curve is the elliptic curve that defines E (GF (p)) on a finite field GF (p), in the case that the elliptic curve E is divisible by a large prime number, element G included in the elliptic curve is a base point. In this case, it is a question that in the case that an integer x that satisfies (Equation 1) $Y=x*G$ to a given element Y included in the elliptic curve exists, seek x.

Here, p is a prime number and GF (p) is a finite filed that has p pieces of element. Additionally, within this patent specification, the symbol * shows calculation to add element included in the elliptic curve plural times, $x*G$, as the below-mentioned equation shows, means that element G is added x times.

$$x*G = G+G+G+\ldots+G$$

The reason that makes the discrete logarithm problem a premise of the security of the public-key encryption is that the above-mentioned problem to the finite field that has many elements is extremely difficult.

3. ElGamal Signature that Applies the Discrete Logarithm Problem on the Elliptic Curve Thereinafter, the digital signature mode by ElGamal signature that applies discrete logarithm problem on the elliptic curve is explained by using FIG. 1. This figure is a sequence diagram that shows procedures of the digital signature mode by the above-mentioned ElGamal signature. A user A 11, a management center 12 and a user B13 are connected by network. Assume that p is a prime number and an elliptic curve defined on a finite field GF(p) is E. Assume a base point of E is G and the order of E is q. In other words, q is the smallest positive integer to satisfies (Equation 2) $q*G=0$ Moreover, the point $(\infty,\infty)$, where both of x and y coordinates are $\infty$, is called an infinite point, and is represented by 0. This 0, when the elliptic curve is considered as a group, carries out a function of "zero element".

(1) Generation of the Public Keys by the Management Center 12

The management center 12 generates the public key YA of the user A 11, using the secret key xA of the user A 11 that is notified in advance, and complying with the equation 3 (Step S141~S142).

$$YA=xA*G \qquad \text{(Equation 3)}$$

Thereafter, the management center 12 releases the prime number p, the elliptic curve E and the base point G to the public as system parameters, and releases the public key YA of the user A 11 to another user B 13 (Step S143~S144).

(2) Generation of a Signature by the User A11

The user A 11 generates a random number k (Step S145). Then, the user A 11 calculates (Equation 4) $R_1=(rx, ry)=k*G$ (Step S 146) and calculates s from (Equation 5) $s\times k=m+rx\times xA$ (mod q). Here, m is a message that the user A 11 transmits to the user B 13. Furthermore, the user A 11 transmits obtained $(R_1, s)$ as a signature with the message m to the user B 13 (Step S148).

(3) The Verification of the Signature by the User B 13

The user B 13 confirm the identity of the user A 11 by judging whether (Equation 6) $s*R_1=m*G+rx*YA$ satisfies or not (Step S149). This is obvious because $$\begin{aligned} s*R_1 &= \{((m+rx\times xA)/k)\times k\}*G \qquad \text{(Equation 7)}\\ &= (m+rx\times xA)*G\\ &= m*G+(rx\times xA)*G\\ &= m*G+rx*YA \end{aligned}$$

satisfies.

4. Addition of Points on the Elliptic Curve and Calculation Quantity by Double Multiplication In each of the generation of the public key, the generation of the signature and the verification of the signature in the digital signature mode that is indicated above by ElGamal signature that applies the discrete logarithm problem on the elliptic curve, the calculation of scalar multiplication of points on the elliptic curve is carried out. For example, "xA*G" indicated in the equation 3, "k*G" indicated in the equation 4, "s*$R_1$", "m*G" and "rx*YA" indicated in the equation 6 are the calculation of the scalar multiplication of the points on the elliptic curve.

The calculation formula of the elliptic curve is explained in detail in "Efficient elliptic curve exponentiation" (written by Miyaji, Ono, and Cohen, Advances in cryptology-proceedings of ICICS, 97, Lecture notes in computer science, 1997, Springer-Verlag, 282–290).

Thereinafter, the calculation formula of the elliptic curve is explained. Assume that the equation of the elliptic curve is $y^2=x^3+a\times x+b$, the coordinates of a given point P are $(x_1, y_1)$ and the coordinates of a given point Q are $(x_2, y_2)$. Here, assume that the coordinates of the point R fixed by R=P+Q are $(x_3, y_3)$.

In the case of P≠Q, R=P+Q becomes the calculation of addition. The formulae of addition are as follows:

$$x_3=\{(y_2-y_1)/(x_2-x_1)\}^2 x_1-x_2$$

$$y_3=\{(y_2-y_1)/(x_2-x_1)\}(x_1-x_3)-y_1$$

In the case of P=Q, R=P+Q=P+P=2×P satisfies, R=P+Q becomes double multiplication.

The formulae of double multiplication are as follows:

$$x_3=\{(3x_1^2+a)/2y_1\}^2-2x_1$$

$$y_3=\{(3x_1^2+a)/2y_1\}(x_1-x_3)-y_1$$

Moreover, the above-mentioned calculation is a calculation on the finite field in which elliptic curve is defined. As was indicated above, in 2-term coordinates or affine coordinates, namely, the coordinates described until now, in case that addition calculation is carried out, every one addition on the elliptic curve needs one inverse number calculation. In general, an inverse number calculation needs about 10 times calculation quantity compared with a multiplication on a finite filed.

Then, to reduce the calculation quantity, 3-term coordinates called projection coordinates are used. Projection coordinates are coordinates comprising three terms X, Y, Z, in relation to the coordinate (X, Y, Z) and the coordinate (X', Y', Z'), a given number n exists and there is a relationship X'=n X, Y'=n Y, Z'=n Z satisfies, (X, Y, Z)=(X', Y', Z') satisfies. An affine coordinate (x, y) and a projection coordinate (X, Y, Z) corresponds to each other in the below-mentioned relationship.

(x, y)→(x, y, 1)

(X, Y, Z)→(X/Y, Y/Z)(in the case of Z≠0)

Here, the symbol → is used as the below-mentioned meaning. When a given element in a set $S_1$ corresponds to one element in a set $S_2$, the relationship is indicated by $S_1 \to S_2$.

Thereinafter, all the calculations of the elliptic curve are in the projection coordinates. Next, the addition formulae and the double multiplication formulae on the projection coordinates are explained. These formulae have, of course, consistency with the addition formulae and the double multiplication formulae in the affine coordinates. The calculation of scalar multiplication is realized by the repeated calculation of the addition and the double multiplication on the elliptic curve. Out of these calculations of scalar multiplication, the calculation quantity of addition does not depend on the parameters of the elliptic curve, but the calculation quantity of the double multiplication depends on the parameters of the elliptic curve.

Here, assume that p is a prime number of 160 bits and the elliptic curve is E: $y^2=x^3+ax+b$, and when the elements P, Q on the elliptic curve are indicated by $P=(X_1, Y_1, Z_1)$ and $Q=(X_2, Y_2, Z_2)$, $R=(X_3, Y_3, Z_3)=P+Q$ is obtained as follows:

(i) in the case of P≠Q

In this case, it is a calculation of an addition.

(Step 1-1) The Calculation of an Intermediate Value

The below-mentioned equations are calculated.

$$U_1=X_1\times Z_2^2 \qquad \text{(Equation 8)}$$

$$U_2=X_2\times Z_1^2 \qquad \text{(Equation 9)}$$

$$S_1=Y_1\times Z_2^3 \qquad \text{(Equation 10)}$$

$$S_2=Y_2\times Z_1^3 \qquad \text{(Equation 11)}$$

$$H=U_2-U_1 \qquad \text{(Equation 12)}$$

$$r=S_2-S_1 \qquad \text{(Equation 13)}$$

(Step 1-2) The Calculation of $R=(X_3, Y_3, Z_3)$

The below-mentioned equations are calculated.

$$X_3=-H^3-2\times U_1\times H^2+r^2 \qquad \text{(Equation 14)}$$

$$Y_3=-S_1\times H^3+r\times(U_1\times H^2-X_3) \qquad \text{(Equation 15)}$$

$$Z_3=Z_1\times Z_2\times H \qquad \text{(Equation 16)}$$

(ii) in the case of P=Q (namely, R=2P)

In this case, it is a calculation of double multiplication.

(Step 2-1) The Calculation of an Intermediate Value

The below-mentioned equations are calculated.

$$S=4\times X_1\times Y_1^2 \qquad \text{(Equation 17)}$$

$$M=3\times X_1^2+a\times Z_1^4 \qquad \text{(Equation 18)}$$

$$T=-2\times S+M^2 \qquad \text{(Equation 19)}$$

(Step 2-2) The Calculation of $R=(X_3, Y_3, Z_3)$

The below-mentioned equations are calculated.

$$X_3=T \qquad \text{(Equation 20)}$$

$$Y_3=-8\times Y_1^4+M\times(S-T) \qquad \text{(Equation 21)}$$

$$Z_3=2\times Y_1\times Z_1 \qquad \text{(Equation 22)}$$

Next, the calculation quantity in the case of the addition and the double multiplication of the elliptic curve are explained. Here, the calculation quantity by one multiplication is indicated by 1 Mul, and the calculation quantity by one square multiplication is indicated by 1 Sq. Moreover, in an ordinary microprocessor, 1 Sq≈0.8 Mul satisfies.

According to the above-mentioned examples, the calculation quantity of the addition on the elliptic curve indicated in the case of P≠Q is obtained by counting the numbers of the multiplication and the square multiplication in the equations 8~16 and is 12 Mul+4 Sq. This is obvious because the calculation quantities of the addition in the equations 8, 9, 10, 11, 14, 15 and 16 are 1 Mul+1 Sq, 1 Mul+1 Sq, 2 Mul, 2 Mul, 2 Mul+2 Sq, 2 Mul and 2 Mul, respectively.

Additionally, according to the above-mentioned examples, the calculation quantity of the double multiplication on the elliptic curve indicated in the case of P=Q is obtained by counting the numbers of the multiplication and the square multiplication in the equations 17~22 and 4 Mul+6 Sq. This is obvious because the calculation quantities of the square multiplication in the equations 17, 18, 19, 21 and 22 are 1 Mul+1 Sq, 1 Mul+3 Sq, 1 Sq, 1 Mul+1 Sq and 1 Mul, respectively.

Moreover, in the above-mentioned counting of the number, for example, since the equation 14 $H^3$ can be unfolded to $H^3=H^2\times H$, the calculation quantity of $H^3$ is assumed to be 1 Mul+1 Sq, and since the equation 18 $Z_1^4$ can be unfolded to $Z_1^4=(Z_1^2)^2$, the calculation quantity of $Z_1^4$ is assumed to be 2 Sq.

Moreover, as for the equation 14 $H^2$, in the above-mentioned process of calculating $H^3$, $H^2$ is calculated, therefore the calculation quantity of $H^2$ is not counted again. Additionally, at the time of counting the number of multiplication, the number of multiplication that is carried out by multiplying a certain value by a small value is not counted. Thereinafter, the reason is explained. The small values mentioned here are, in the equations 8~22, the small fixed values that are objects for multiplication and, to be more specific, are the values such as 2, 3, 4, 8 and so forth. These values can be indicated by the binary of 4 bits at most. On the other hand, the other variable numbers have the value of 160 bits ordinarily.

Generally, in a microprocessor, the multiplication of the multiplier and the multiplicand is carried out by the repetition of the shift of the multiplicand and the addition. In other words, for each bit of the multiplier represented by binary, in the case that this bit is 1, in order that the least significant bit of the multiplicand represented by binary matches the position where this bit exists, by shifting the multiplicand, one bit string is obtained. In relation to all the bits of the multiplier, all of at least one bit of string obtained by this means are added.

For example, in the multiplication of the multiplier of 160 bits and the multiplicand of 160 bits, the multiplicand of 160 bits is shifted for 160 times, 160 bit strings are obtained and the obtained 160 bit strings are added. On the hand, in the multiplication of the multiplier of 4 bit and the multiplicand of 160 bits, the multiplicand of 160 bits is shifted for 4 times, 4 bit strings are obtained and the obtained 4 bit stirrings are added.

Since the multiplication is carried out as was indicated above, in the case that the multiplication is carried out by multiplying a certain value by a small value, the number of the above-mentioned repetition becomes small. Accordingly, the calculation quantity can be regarded as small and therefore it is not counted as the number of the multiplication. As was explained above, in the case of carrying out the double multiplication of the elliptic curve, the equation 18 includes the parameter a of the elliptic curve. As the value of this parameter a, for example, when a small value is adopted, the calculation quantity of the double multiplication on the elliptic curve can be reduced by 1 Mul and becomes 3 Mul+6 Sq. Moreover, as for the addition, even though the parameter of the elliptic curve is changed, the calculation quantity does not change.

5. Selection of an Elliptic Curve Suitable for Encryption

Next, the method for selecting an elliptic curve suitable for encryption is explained. Moreover, as for the detail, it is written in "IEEE P1363 Working draft" (issued by IEEE on Feb. 6, 1997). The elliptic curve suitable for encryption is obtained by repeating the steps below.

(Step 1) An Arbitrary Selection of an Elliptic Curve

Arbitrary parameters a and b on the infinite field GF (p) are selected. Here, a and b satisfy the equation 23 and p is a prime number.

$$4\times a^3 + 27 \times b^2 \not\equiv 0 \pmod{p} \quad \text{(Equation 23)}$$

Assume that the elliptic curve is E: $y^2=x^3+a\times x+b$ by using the selected a and b.

(Step 2)

To judge whether it is the elliptic curve suitable for encryption, the number of the elements of the elliptic curve E, #E(GF (p)) is calculated, in the case that #E (GF (p)) is divisible by a large prime number (condition 1), and that #E (GF (p))−(p+1)≠0, −1 (condition 2), the elliptic curve E is adopted.

As was explained above, in the case that as the parameter a of the elliptic curve, a fixed small value is elected, although the calculation quantity in the calculation of the scalar multiplication of the elliptic curve is reduced, there is a problem that it is difficult to select a safe elliptic curve suitable for encryption by fixing the parameter in advance.

Conversely, by using the selection method explained above, in the case of selecting a safe elliptic curve suitable for encryption, it is not always possible to select a small value as the parameter a of the elliptic curve, and therefore there is a problem that the calculation quantity cannot be reduced. Thus, to select a safe elliptic curve suitable for encryption and to reduce the calculation quantity in the elliptic curve, there are problems that are contradictory and antagonistic to each other.

6. A Conventional Elliptic Curve Converting Device

To solve the above-mentioned problem, in the Japanese Patent No. 3050313 "AN ELLIPTIC CURVE CONVERTING DEVICE, AND DEVICE AND SYSTEM FOR UTILIZATION", the below-mentioned elliptic curve converting device is indicated. This conventional elliptic curve converting device is a device that converts the inputted and arbitrary elliptic curve E: $y^2=x^3+ax+b$ without changing its order into the elliptic curve E: $y^2=x^3+ax+b$ with a small coefficient a (a=−3 and so forth). In other words, maintaining safety, the elliptic curve that is capable of reducing further the calculation quantity is generated.

This device converts the inputted elliptic curve into an isomorphic elliptic curve.

The elliptic curve converting device comprises, as FIG. 2 shows, a parameter receiving unit 110, a converting coefficient acquiring unit 120, a converted elliptic curve calculating unit 130, a parameter sending unit 140.

The parameter receiving unit 110 receives, from outside devices, parameters a and b, an element G on the elliptic curve and a prime number p. Here, p is a prime number of 160 bits.

The outside devices include an encryption device using public-key encryption, a decryption device, a digital signature device, a digital signature verification device, a key-sharing device and so forth. The outside devices use the discrete logarithm problem on the elliptic curve as the premise for the security of the public-key encryption and have the elliptic curve. Here, the elliptic curve that is constructed on the infinite field GF (p) arbitrarily is indicated by E: $y^2=x^3+ax+b$, and the element G is an arbitrary point on the elliptic curve and is indicated by G=(x0, y0).

the converting coefficient acquiring unit 120 has a function T (i). The function T (i) has, in the case of i=0, 1, 2, 3 4, the values −3, 1, −1, 2, −2, respectively. Additionally, the function T (i) has, in the case of i=5, 6, 7, 8, 9, 10, 11, . . . , the values 3, 4, −4, 5, −5, 6, −6 . . . , respectively.

The converting coefficient acquiring unit 120 calculates a converting coefficient t that begins from i=0, increases the value of i one by one, satisfies $$-2^{31}+1 \leq T(i) \leq 2^{31}-1, \quad \text{(Equation 24)}$$

and $$T(i)=t^4 \times a \pmod{p}, \quad \text{(Equation 25)}$$

and is an element on the infinite field GF (p).

Here, the equation 24 indicates that T (i) is taken on to be less than 32 bits. Moreover, the function T (i) has, in the case of i=0, the value −3 and the converting coefficient acquiring unit 120 refers to the value of the function T (i), beginning from i=0 and adding the value of i one by one, and therefore the value −3 is referred to at the beginning.

Additionally, the function T (i) has, except that it has the value −3 in the case of i=0, the values in sequence from a small absolute value to a large absolute value, and therefore the function T (i) can be referred to in sequence from a small absolute value.

The converted elliptic calculating unit 130 calculates, respectively and as follows, parameters a' and b' of the converted elliptic curve Et: $y'^2=x'^3+a' \times x'+b'$ that is constructed on the infinite field GF (p).

$$a'=a \times t^4 \quad \text{(Equation 26)}$$

$$b'=b \times t^6 \quad \text{(Equation 27)}$$

Additionally, the converted elliptic curve calculating unit 130 calculates the element Gt=(xt 0, yt 0) on the converted elliptic curve Et corresponding to the element G as follows:

$$xt0=t^2 \times x0 \quad \text{(Equation 28)}$$

$$yt0=t^3 \times y0 \quad \text{(Equation 29)}$$

Moreover, an arbitrary point on the elliptic curve E is converted into one point on the converted elliptic curve Et defined by the parameters a' and b' generated as was stated above.

The parameter sending unit 140 sends out the calculated parameters a' and b' on the converted elliptic curve Et, and an element Gt (xt 0, yt 0) to the outside devices.

The conventional elliptic curve converting device like this operates as follows:

The parameter receiving unit 110 receives the prime number p, the parameters a and b (Step S151), and the element G on the elliptic curve (Step S152) from the outside devices. Next, the converting coefficient acquiring unit 120 calculates a converting coefficient (Step S153), the converted elliptic curve calculating unit 130 calculates the parameters a' and b' on the converted elliptic curve Et constructed on the infinite field GF (p) and the element Gt=(xt 0, yt 0) on the converted elliptic curve corresponding to the element G (Step S154), and the parameters sending unit 140 sends out the calculated parameters a' and b', and the element Gt (xt 0, yt 0) (Step S155).

Moreover, the detailed operations of the converting coefficient acquiring unit 120 are as follows:

The converting coefficient acquiring unit 120 sets a value 0 to i (Step S161). Next, the converting coefficient acquiring unit 120 judges that as for the function T (i), whether $-2^{31}+1 \leq T(i) \leq 2^{31}-1$ satisfies or not. When the equation does not satisfy (Step S162), the converting coefficient acquiring unit 120 finishes the operations. When the equation satisfies (Step S162), the converting coefficient acquiring unit 120 calculates a coefficient t that turns out to be $$T(i)=t^4 \times a \pmod{p}$$

(Step S163), judges whether the calculated coefficient t is an element on the infinite field GF (p) or not, when it is the element on the infinite field GF (p) (Step S164), the converting coefficient acquiring unit 120 finishes the operations. When it is not an element on the infinite field GF (p) (Step S164), the converting coefficient acquiring unit 120 adds 1 to i (Step S165) and backs the control to Step S162 again.

Next, the converted elliptic curve calculating unit 130 operates as follows:

The converted elliptic curve calculating unit 130 calculates a parameter $a'=a \times t^4$ of the converted elliptic curve constructed on the infinite field GF (p) (Step S 171), and a parameter $b'=b \times t^6$ (Step S172). Additionally, the converted elliptic curve calculating unit 130 calculates, as the element Gt=(xt$_0$, yt$_0$) corresponding to the element G, $xt_0=t^2 \times x_0$ (Step S173) and $yt_0=t^3 \times y_0$ (Step 174).

This conventional elliptic curve converting device converts the inputted elliptic curve into an isomorphism of the elliptic curve. At Step 164, when T (i)=−3, only in the case that t of the equation 23 is an element of GF (p), it is possible to convert into the elliptic curve that has an equation $y^2=x^3-3x+b$.

Here, to be $-3=a \times t^4$, the forth root of −3/a on GF (p) must exist. As for an arbitrary x, since the probability that the square root of x on GF (p) exists is 1/2, the probability that the fourth root exists is "the probability that a square root of the square root exists", and therefore 1/2×1/2=1/4. Accordingly, the probability that the above-mentioned t is an element of GF (p) is low at 1/4, and therefore it is not always possible to convert into the elliptic curve that has the equation $y^2=x^3-3x+b$.

7. Montgomery-type Elliptic Curve

The above-mentioned elliptic curve converting device makes only the elliptic curves whose equation is $y^2=x^3+ax \times x+b$ as its objects. The elliptic curve like this is called a Weierstrass-type elliptic curve.

On the other hand, the elliptic curve whose equation is $B \times y^2=x^3+A \times x^2+x$ is called a Montgomery-type elliptic curve. This elliptic curve is known that the addition and the double multiplication of points are fast, and the calculation quantities are 4 Mul+2 Sq and 3 Mul+2 Sq, respectively. As was stated in above-mentioned 5, the calculation quantities of the addition and the double multiplication of the Weierstrass-type elliptic curve are 12 Mul+4 Sq and 4 Mul+6 Sq, respectively. Consequently, the Montgomery-type elliptic curve is faster in the addition and the double multiplication of the points. The Montgomery-type elliptic curve is described in detail in "Speeding the Pollard and Elliptic Curve Methods of Factorization" (written by P. L. Montgomery, Math. of Comp. 48, 1987, pp. 243–264).

On the other hand, in a method to generate a safe elliptic curve, there is a case of generating a safe elliptic curve by doing the order calculation and judging whether the elliptic curve is safe or not. Here, in the order calculation, the elliptic curve that is used is also the Weierstrass-type. Consequently, the elliptic curve generated by this method is limited to the Weierstrass-type.

By a similar way of thinking of the conventional elliptic curve converting device, it is thinkable to convert a Weierstrass-type elliptic curve into a Montgomery-type elliptic curve by using the isomorphism of the elliptic curve. Here, as in the case of seeking the elliptic curve that satisfies a=−3 in the conventional elliptic curve converting device, the conversion is not always possible. In other words, the Weierstrass-type elliptic curves which cannot be converted into the Montgomery-type elliptic curves exist. As was stated above, in the case of using an isomorphism, by a technical literature "On the calculation method of the elliptic curve encryption arithmetic (written by Tetsuya Izu, SCIS' 99, pp. 275–280), the probability that Weierstrass-type elliptic curves can be converted into the Montgomery-type elliptic curves is about 19/48, and therefore there is a problem that it is not always possible to convert into the Montgomery-type elliptic curves.

As was stated above, the conventional elliptic curve converting device can convert the inputted arbitrary elliptic curve, with the safety maintained, into the elliptic curve $y^2=x^3-3x+b$ (the Weierstrass-type elliptic curve), there is a problem that the conversion is not always possible. Additionally, there is a problem that the conversion from Weierstrass-type elliptic curve into the Montgomery type elliptic curve is not always possible.

SUMMARY OF THE INVENTION

Consequently, it is an object of this invention to provide an elliptic curve converting device and so forth that can convert an arbitrary elliptic curve into an elliptic curve $y^2=x^3-3x+b$ that further reduces a calculation quantity with the security maintained and with an extremely high probability.

Furthermore, it is also an object of this invention to provide an elliptic curve converting device and so forth that can convert an arbitrary Weierstrass-type elliptic curve into a Montgomery-type elliptic curve that further reduces a calculation quantity with the security maintained and with an extremely high probability.

In order to achieve the above-mentioned objects, the elliptic curve converting device according to this invention is an elliptic curve converting device that converts a first elliptic curve defined on a finite field F into a second elliptic curve defined on the finite field F comprising: a search unit operable to search an elliptic curve that satisfies a speeding-up condition that reduces calculation quantity of arithmetic on the elliptic curve among a group of isogenous elliptic curves of degree $L_1$ that is a group of elliptic curves that has the same order as and a certain relationship with the first elliptic curve; a judgment unit operable to judge whether the elliptic curve that satisfies the speeding-up condition is searched or not by the search unit; and an output unit operable to output an elliptic curve as the second elliptic curve in the case that the judgment unit judges that the elliptic curve that satisfies the speeding-up condition is searched.

Here, it is acceptable that the search unit repeats to search the elliptic curve that satisfies the speeding-up condition in the case that the judgment unit judges that the elliptic curve that satisfies the speeding-up condition is not searched.

For example, it is acceptable that the search unit repeats to search the elliptic curve that satisfies the speeding-up condition in the case that the judgment unit judges that the elliptic curve that satisfies the speeding-up condition is not searched and that the search unit identifies a tentative elliptic curve that is a candidate of the elliptic curve that satisfies the speeding-up condition that reduces calculation quantity of arithmetic on the elliptic curve among a group of isogenous elliptic curves of degree $L_1$ that is a group of elliptic curves that has the same order as and a certain relationship with the first elliptic curve, the judgment unit judges whether the tentative elliptic curve identified by the search unit satisfies the speeding-up condition or not, and the search unit, in the case that the judgment unit judges that the tentative elliptic curve does not satisfies the speeding-up condition, makes the tentative elliptic curve the new first elliptic curve, and searches the elliptic curve that satisfies the speeding-up condition that reduces calculation quantity of arithmetic on the elliptic curve among a group of isogenous elliptic curves of degree $L_1$ that is a group of elliptic curves that has the same order as and a certain relationship with the first elliptic curve.

Additionally, it is acceptable that the speeding-up condition is "a=−3" on the equation $y^2=x^3+a\times x+b$ or that the elliptic curve is a Montgomery-type elliptic carve.

Moreover, the elliptic curve utilization device according to this invention is an elliptic curve utilization device that uses an elliptic curve obtained by an elliptic curve converting device comprising: a memorizing unit operable to memorize a parameter that identifies the elliptic curve; and a utilization unit operable to execute encryption, decryption, a digital signature, digital signature verification or key-sharing using an elliptic curve defined on a finite filed F and the parameter memorized by the memorizing unit, wherein the elliptic curve converting device that converts a first elliptic curve defined on a finite field F into a second elliptic curve defined on the finite field F comprises: a search unit that searches an elliptic curve that satisfies a speeding-up condition that reduces calculation quantity of arithmetic on the elliptic curve among a group of isogenous elliptic curves of degree $L_1$ that is a group of elliptic curves that has the same order as and a certain relationship with the first elliptic curve; a judgment unit that judges whether the elliptic curve that satisfies the speeding-up condition is searched or not by the search unit; and an output unit that outputs an elliptic curve as the second elliptic curve in the case that the judgment unit judges that the elliptic curve that satisfies the speeding-up condition is searched.

Additionally, the elliptic curve generating device according to the present invention is an elliptic curve generating device that generates an elliptic curve defined on an infinite filed F comprising: a generating unit operable to generate a first elliptic curve defined on the infinite filed F; a search unit operable to search an elliptic curve that satisfies a speeding-up condition that reduces calculation quantity of arithmetic on the elliptic curve among a group of isogenous elliptic curves of degree $L_1$ that is a group of elliptic curves that has the same order as and a certain relationship with the generated first elliptic curve; a judgment unit operable to judge whether the elliptic curve that satisfies the speeding-up condition is searched or not by the search unit; and an output unit operable to output an elliptic curve as the second elliptic curve in the case that the judgment unit judges that the elliptic curve that satisfies the speeding-up condition is searched.

Moreover, the present invention is realized not only as the elliptic curve converting device, the elliptic curve utilization device and the elliptic curve generating device but also as an elliptic curve converting method, an elliptic curve utilization method and the elliptic curve generating device with the characteristic units that these devices provide as steps and as a program that causes a computer to execute the steps. And it goes without saying that it is possible to circulate the program widely through recording media like CD-ROM and so forth and transmission media like Internet and so forth.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

(The First Embodiment)

An elliptic curve converting device 200 according to the first embodiment of the present invention is explained.

Figure 1:
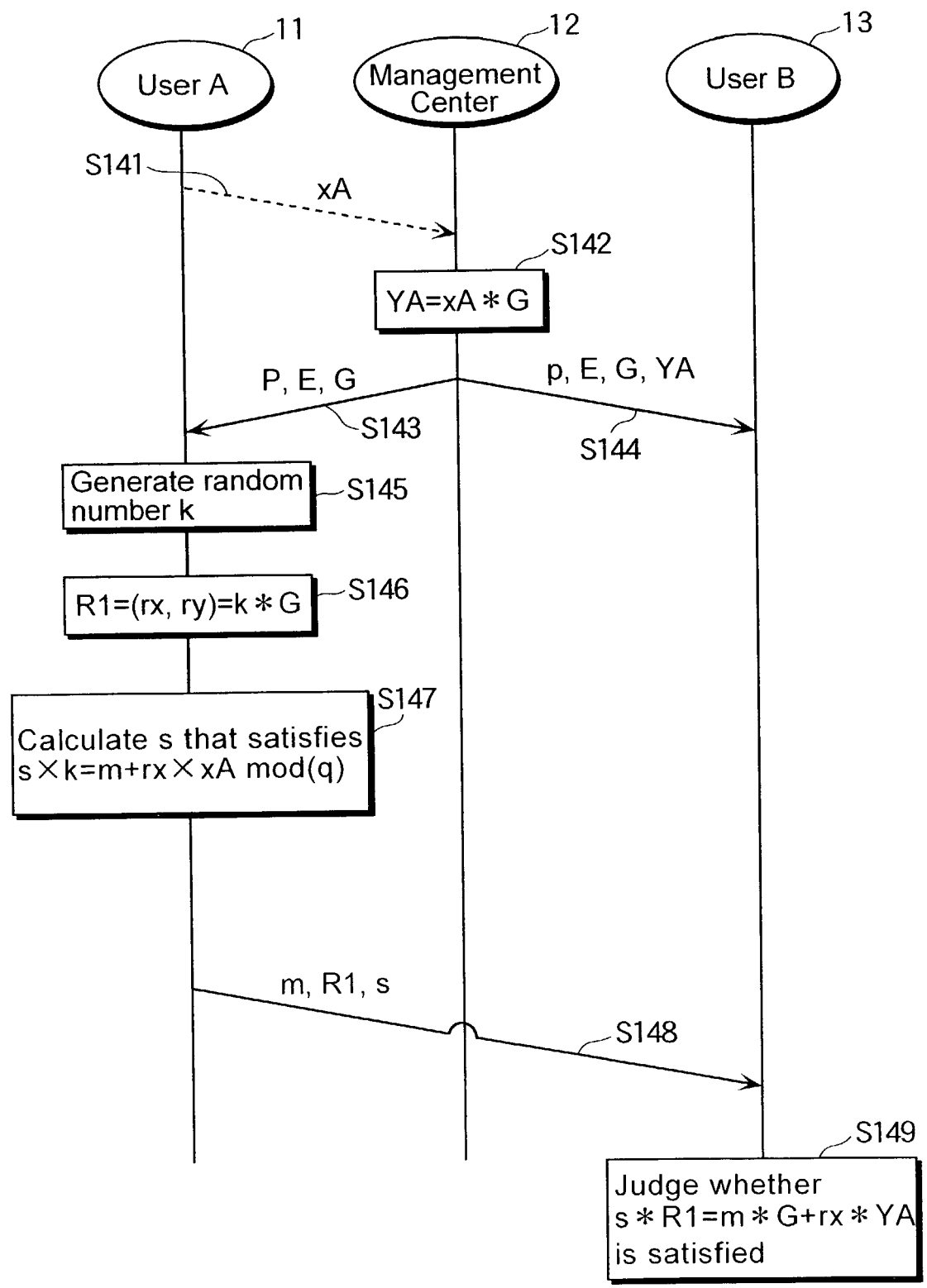
FIG. 1 is a sequence diagram that shows the procedures of the digital signature mode by ElGamal signature.
Figure 2:
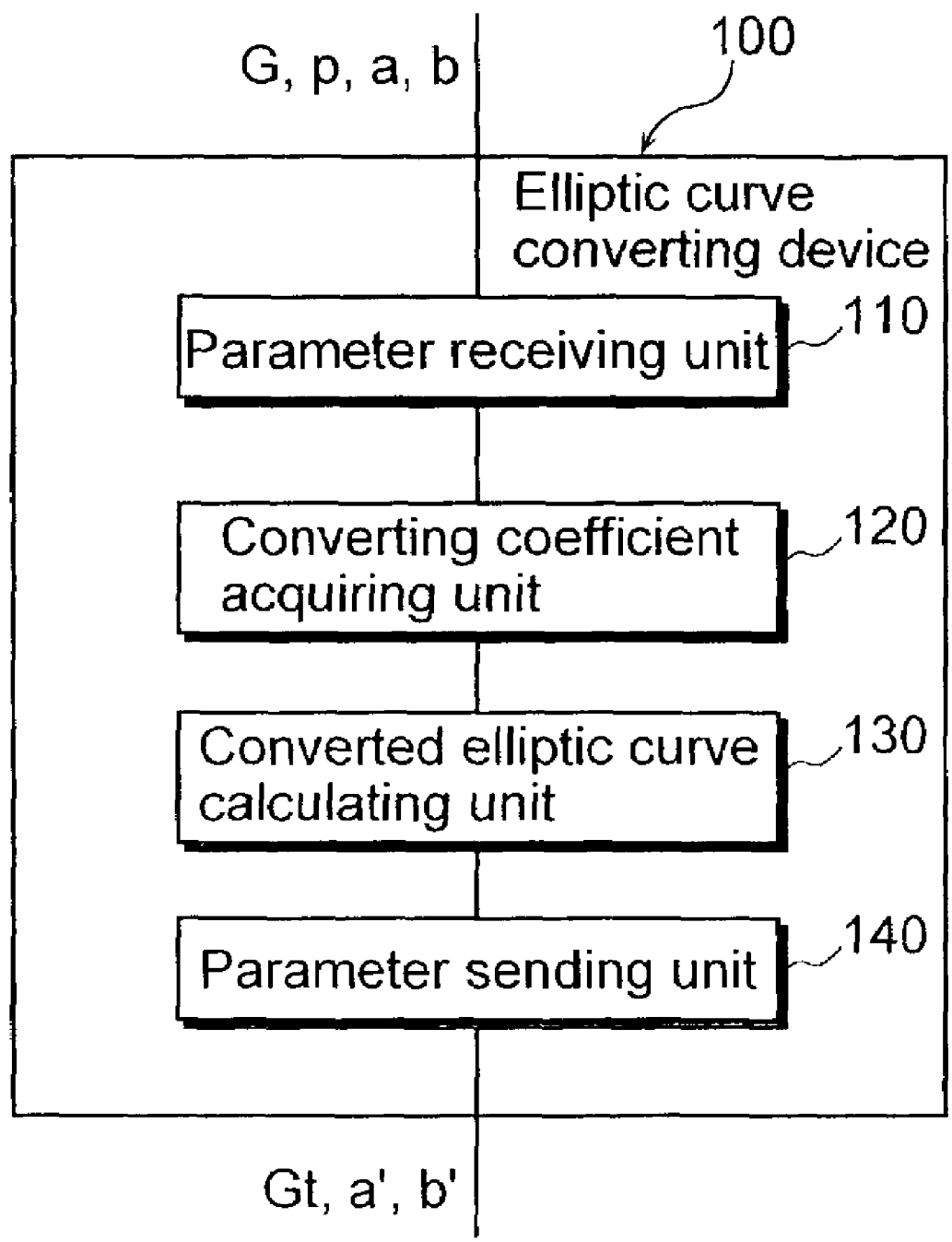
FIG. 2 is a block diagram that shows the conventional elliptic curve converting device.
Figure 3:
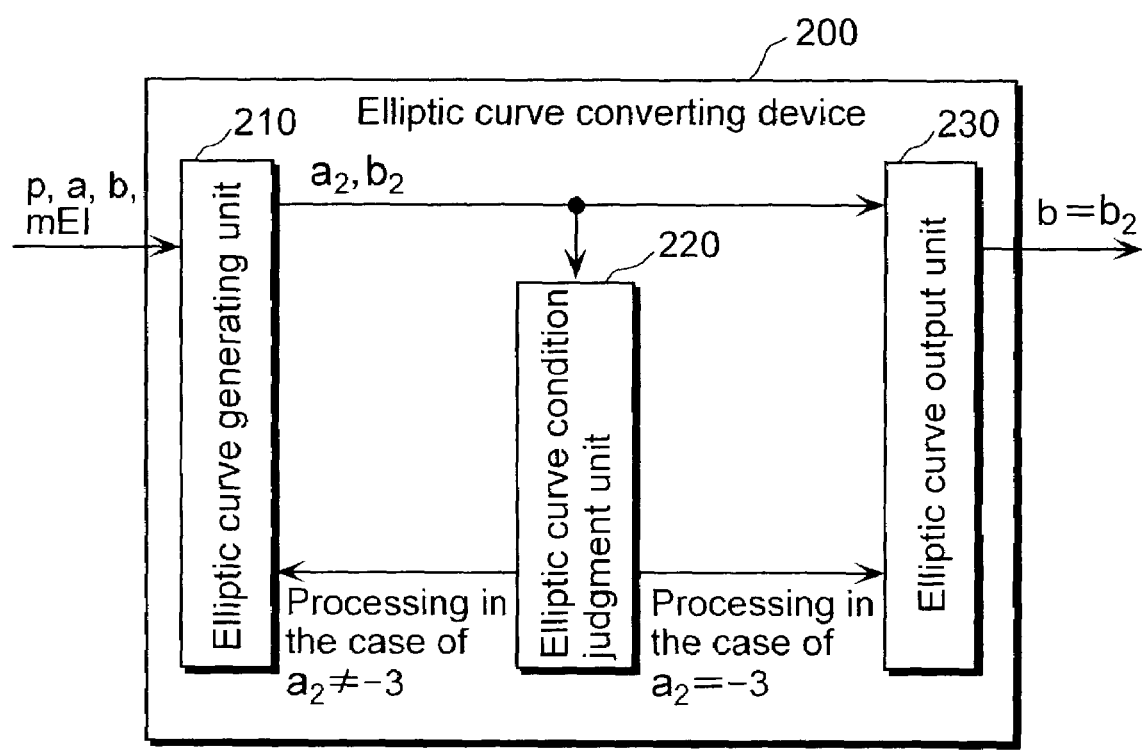
FIG. 3 is a function block diagram that shows the structure of an elliptic curve converting device according to the first embodiment of the present invention.

FIG. 3 is a function block diagram that shows the structure of an elliptic curve converting device 200 according to the first embodiment of the present invention. The elliptic curve converting device 200 is a device that is realized by a program executed on a computer or an electronic circuit like LSI and so forth and functionally comprises an elliptic curve generating unit 210, an elliptic curve condition judgment unit 220 and an elliptic curve output unit 230. The elliptic curve converting device 200 inputs the parameters p, a, b of an elliptic curve EI: $y^2=x^3+a\times x+b$ on the infinite field GF(p) and the order mEI of the elliptic curve EI and outputs the parameter b' of the isogenous elliptic curve EO: $y^2=x^3-3\times x+b'$. "Isogenous" will be explained later. Here, x×y indicates the product of x and y.

The elliptic curve generating unit 210 receives an inputted arbitrary elliptic curve, generates an isogenous elliptic curve of the inputted elliptic curve and outputs the generated elliptic curve to the elliptic curve condition judgment unit 220 and the elliptic curve output unit 230. To be more specific, the elliptic curve generating unit 210 inputs the parameters p, a, b of the elliptic curve EI: $y^2=x^3+a\times x+b$ on the finite field GF (p) and the order mEI of the elliptic curve EI, decides the isogenous elliptic curve $EI_2$: $y^2 \times x^3 + a_2 \times x + b_2$ and outputs the parameters $a_2$ and $b_2$ to the elliptic curve condition judgment unit 220 and the elliptic curve output unit 230.

The elliptic curve condition judgment unit 220 judges whether the elliptic curve outputted by the elliptic curve generating unit 210 satisfies the coefficient $a_2=-3$ or not, and in the case that the elliptic curve dose not satisfy the coefficient $a_2=-3$, by notifying the elliptic curve generating unit 210 accordingly, has the elliptic curve generating unit 210 repeat the similar processing (generation of a new elliptic curve) again with the just outputted elliptic curve as a newly inputted elliptic curve. On the other hand, in the case that the elliptic curve satisfies the coefficient $a_2=-3$, the elliptic curve condition judgment unit 220 notifies the elliptic curve output unit 230 accordingly.

The elliptic curve output unit 230 outputs, in the case of receiving a notification that the conditions are satisfied from the elliptic curve condition judgment unit 220, the elliptic curve outputted by the elliptic curve generating unit 210 to the outside. To be more specific, the elliptic curve output unit 230 outputs the parameter $b_2$ of the elliptic curve $EI_2$ received from the elliptic curve generating unit 210 as the parameter b' of the final elliptic curve EO: $y^2=x^3-3\times x+b'$ to the outside.

Next, the operations of the elliptic curve converting device 200 according to the present embodiment that is constructed as above are explained.

Figure 4:
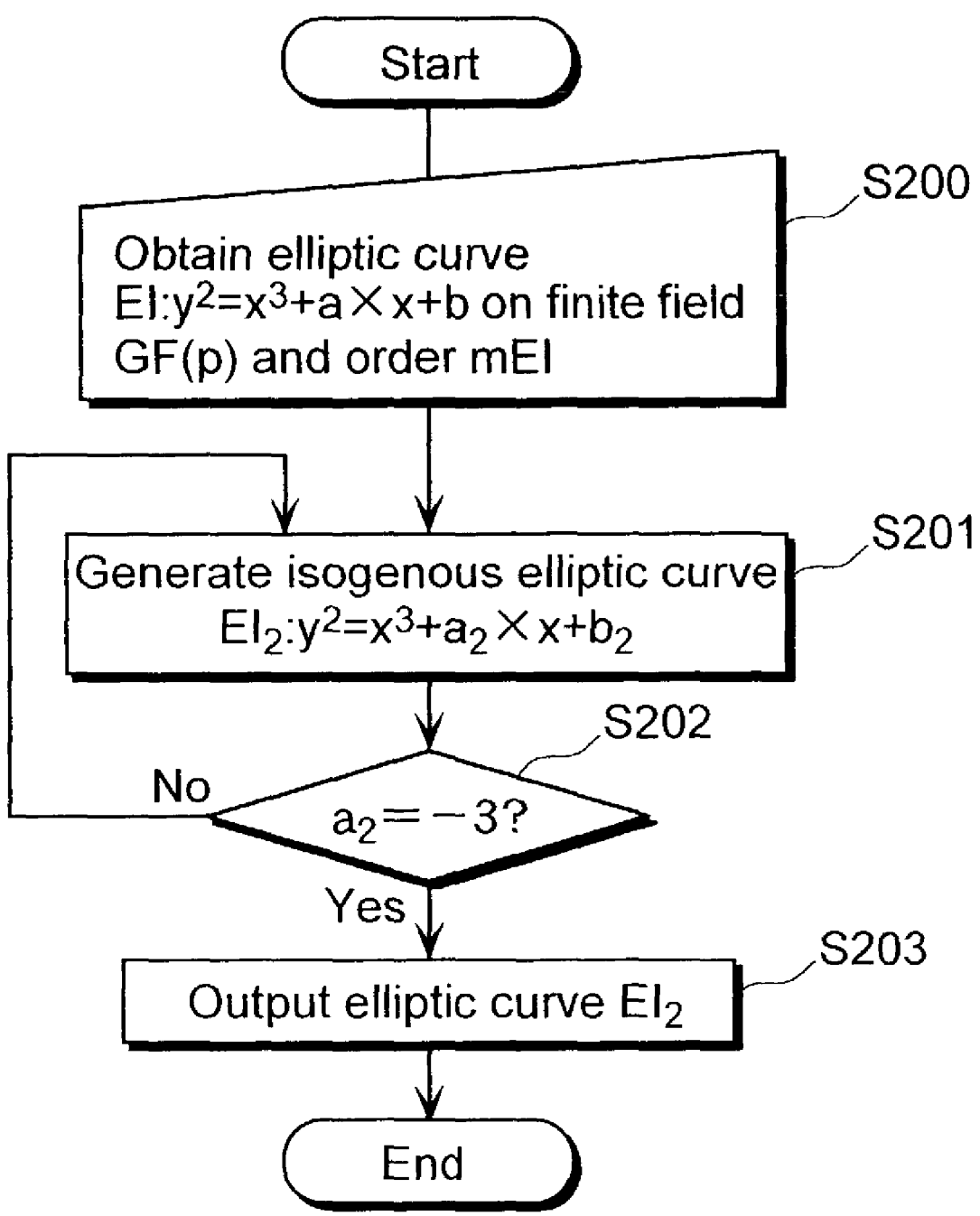
FIG. 4 is a flow chart that shows the operations of the elliptic curve converting device.

FIG. 4 is a flow chart that shows the operations of the elliptic curve converting device 200. The elliptic curve generating unit 210 receives the inputted arbitrary elliptic curve (Step S200), generates an isogenous elliptic curve of the inputted elliptic curve (Step 201) and outputs the generated elliptic curve to the elliptic curve condition judgment unit 220 and the elliptic curve output unit 230. The elliptic curve condition judgment unit 220 judges whether the elliptic curve outputted by the elliptic curve generating unit 210 satisfies $a_2=-3$ or not (Step S202).

As a result of the judgment, in the case that the elliptic curve dose not satisfy the coefficient $a_2=-3$ (No at Step S202), the elliptic curve condition judgment unit 220 notifies the elliptic curve generating unit 210 accordingly. The elliptic curve generating unit 210 that has received the notification repeats generation of another isogenous elliptic curve again with the just generated elliptic curve as the elliptic curve to be inputted (Step S201~S202).

On the other hand, as a result of the judgment, in the case that the elliptic curve satisfies the coefficient $a_2=-3$ (Yes at Step S202), the elliptic curve condition judgment unit 220 notifies the elliptic curve output unit 230, which outputs the parameter $b_2$ of the elliptic curve $EI_2$ outputted from the elliptic curve generating unit 210 as b' to the outside (Step S203).

Figure 5:
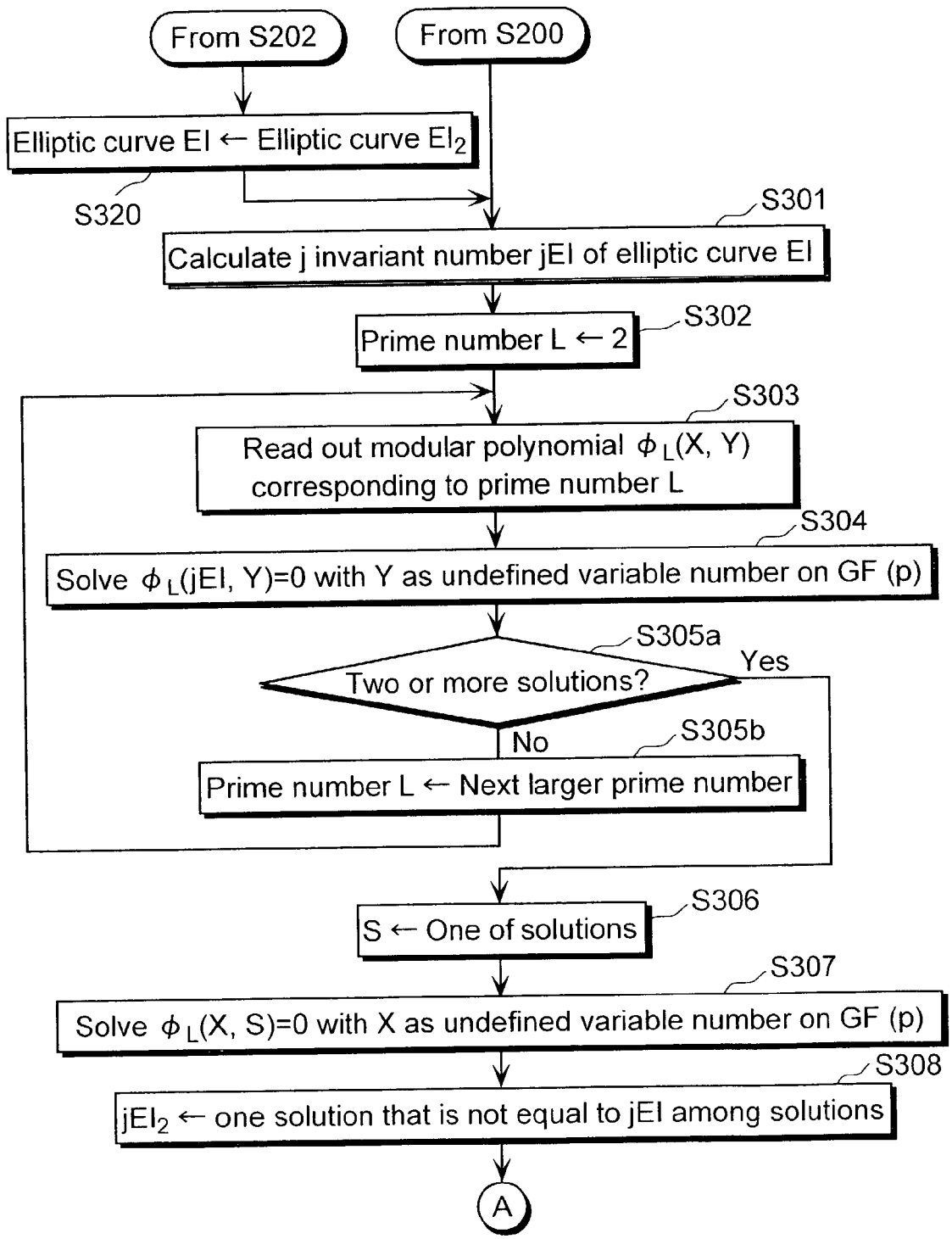
FIG. 5 is the first half of a flow chart that shows detailed procedures of processing by an elliptic curve generating unit (Step S201) in FIG. 4.
Figure 6:
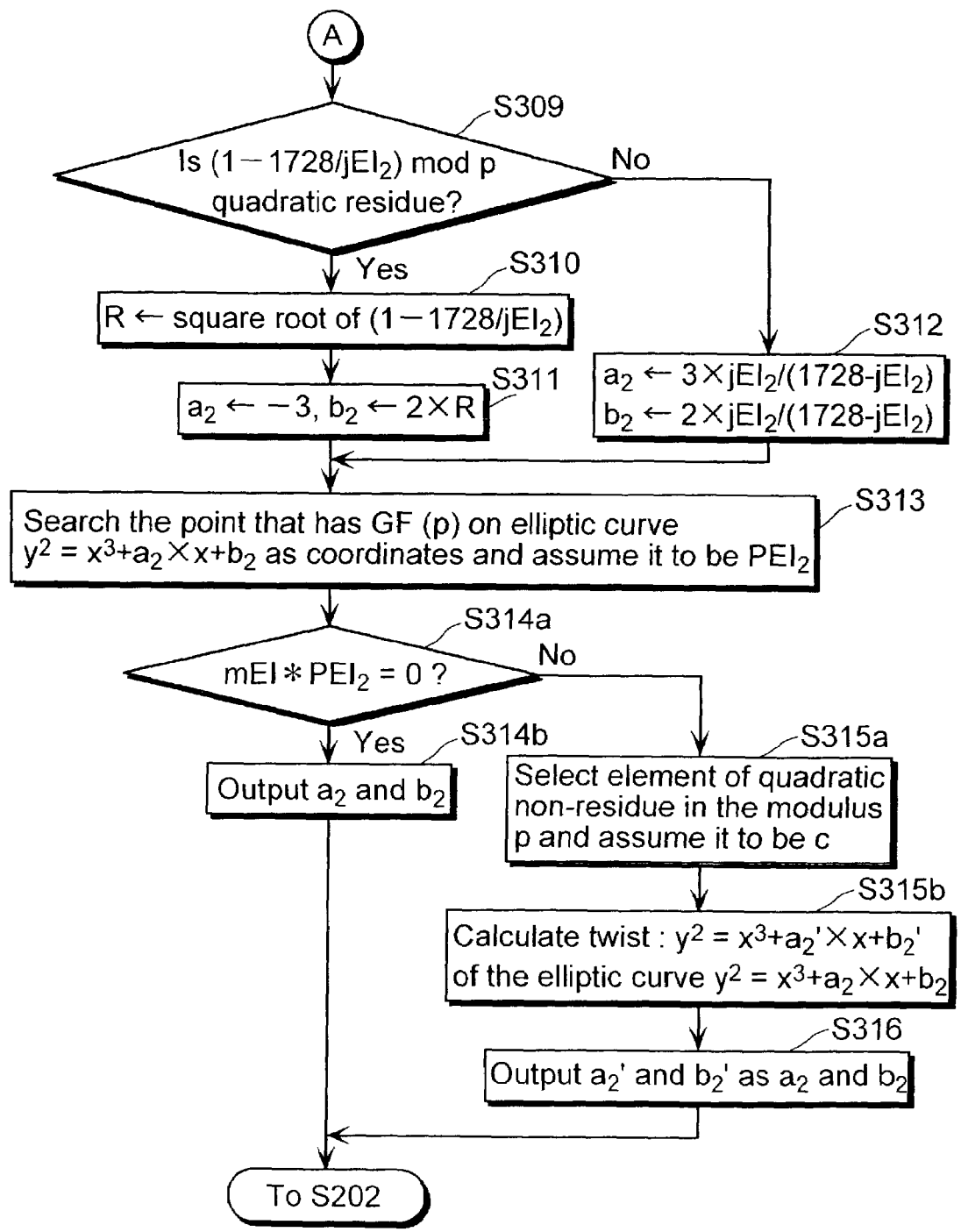
FIG. 6 is the latter half of a flow chart that shows detailed procedures of processing by an elliptic curve generating unit (Step S201) in FIG. 4.

FIG. 5 and FIG. 6 are flow charts that show detailed procedures of processing by an elliptic curve generating unit 210 (Step S201) in FIG. 4.

The elliptic curve generating unit 210 generates, by the procedures described below, from the inputted elliptic curve EI: $y^2=x^3+a\times x+b$, the isogenous elliptic curve $EI_2$: $y^2=x^3+a_2\times x+b_2$.

Step S301: By the equation below, seek j-invariant jEI of the elliptic curve EI.

$$jEI=1728\times(4\times a^3+27\times b^2)/(4\times a^3)$$

Step S302: Set the initial value (2) to a prime number L.

Step S303: Read out a modular polynomial $\phi_L$ (X, Y) corresponding to the prime number L.

Step S304: Solve $\phi_L$ (jEI, Y)=0 with Y as an undefined variable number on the finite field GF (p).

Step S305 (S305a, S305b): In the case that there are not two or more solutions, to the prime number L, set the next larger prime number and back to Step S303. Moreover, as for the prime number L, set the value taken out from the sequence of prime numbers that are memorized in advance (2, 3, 5, 7, . . . ) in the order from a small number to a large number.

Step S306: Among the above-mentioned solutions, select one, and assume it to be S.

Step S307: Solve $\phi_L$(X, S)=0 with X as an undefined variable number on the finite field GF (p).

Step S308: Take one solution that is not equal to jEI among the above-mentioned solutions, and assume it to be $jEI_2$.

Step S309: Judge whether $(1-1728/jEI_2)$ is a quadratic residue or not in the modulus p. In the case of the quadratic residue, advance to Step S310. In other cases, advance to Step S312.

Step S310: Seek the square root of $(1-1728/jEI_2)$ on GF (p) and assume it to be R.

Step S311: Assume that $a_2=-3$, $b_2=2\times R$. Advance to Step S313.

Step S312: Seek $a_2$ and $b_2$ by the equations below.

$$a_2=3\times jEI_2/(1728-jEI_2)$$

$$b_2=2\times jEI_2/(1728-JEI_2)$$

Step S313: Search the point that has GF (p) on the elliptic curve $y^2=x^3+a_2\times x+b_2$ as the coordinates and assume it to be $PEI_2$.

Step S314 (S314a, S314b): Judge whether $mEI*PEI_2$=O. Here, O is the zero element of $EI_2$ and $mEI*PEI_2$ is a point that is mEI-fold of $PEI_2$. In the case of satisfying, output $a_2$ and $b_2$, and finish. In the case of other than that, advance to Step S315.

Step S315 (S315a, S315b): Select an element of a quadratic non-residue in the modulus p and assume it to be c. By the equations below, seek twist: $y^2=x^3+a_2'\times x+b_2'$ of the elliptic curve $y^2=x^3+a_2\times x+b_2$. Twist will be described later.

$$a_2'=c^2\times a_2$$

$$b_2'=c^3\times b_2$$

Step S316: Output $a_2'$ and $b_2'$ as $a_2$ and $b_2$ and finish.

Moreover, the elliptic curve generating unit 210, in the case of receiving a notification that $a_2\neq-3$ from the elliptic curve condition judgment unit 220, repeats the similar processing (Step S301~S316) again with the just generated elliptic curve $EI_2$ as the newly inputted elliptic curve EI (Step S320)

Here, the significance of processing in the elliptic curve generating unit 210 and the elliptic curve condition judgment unit 220 of the present elliptic curve converting device 200, together with the fundamental mathematical terms, are explained. Moreover, the terms below are described in detail in the technical literature "The Arithmetic of Elliptic Curves" (written by J. H. Silverman, GTM106, Springer-Verlag, 1986).

(The Order of the Elliptic Curve)

When a point on the elliptic curve E on the infinite field F is assumed to be (X, Y) and the coordinates of both of X and Y belong to F, the point is called F rational point. The set in which the zero element O of the group of the elliptic curves is added to the whole F rational points is written E (F). It is known that E (F) forms groups for the addition of the elliptic curve. The number of elements of E (F) is called the order of the elliptic curve. The current safety of the elliptic curve encryption depends on the order of the used elliptic curve. Namely, the elliptic curves that have the same infinite field F and the same order have the equal safety.

(An Isomorphism of an Elliptic Curve)

In the case that the group E (F) of the elliptic curve E and the group E' (F) of the elliptic curve E' are homomorphisms and correspond to one by one, the elliptic curves E and E' are called isomorphisms. It is possible to say that the elliptic curves E and E' are isomorphisms because to E: $y^2=x^3+a\times x+b$, the elliptic curve E': $y^2=x^3+c^4\times a\times x+c^6\times b$ that is given by an element c of the finite field F is (x, Y)→(cx, cy).

(An Isogeny of an Elliptic Curve)

To the elliptic curve E: $y^2=x^3+a\times x+b$, the elliptic curve E" that has the same order as the elliptic curve as E" is called an isogenous elliptic curve with E. Additionally, in the case that the orders of the elliptic curves E and E" are equal, the elliptic curves E and E" are called to be isogenous. The above-mentioned technical literature touches on isogeny, but especially, it is described in detail in the technical literature "Isogeny cycles and the Schoof-Elkies-Atkin algorithm" (written by J.-M. Couveignes, L. Dewaghe and F. Morain, Research Report LIX/RR/96/03, Ecole Polytechnique-LIX, 1996).

(An Isogenous Transforming and a Modular Polynomial)

Between the isogenous elliptic curves, an isogenous transforming exists. In the isogenous transforming $\phi$: E→E", when the number of points on E that move to the zero element O" of E" by the above-mentioned transforming is assumed to be L, $\phi$ is called an isogenous transforming of degree L, and the elliptic curves E and E" are said to be the isogenies of degree L. To seek the elliptic curve that is an isogeny of degree L of the elliptic curve E, a modular polynomial can be used. The modular polynomial is a two-variant polynomial that depends only to L. In the steps S304~S308 by the elliptic curve generating unit 210 in the elliptic curve converting device 200, the elliptic curve that is an isogeny of degree L of the elliptic curve EI is sought. A modular polynomial and how to seek a modular polynomial are described in detail particularly in the technical literatures "Calcul du nombre de points sur une courbe elliptique dans un corps fini: aspects algorithmiques" (written by F. Morain, J. Theor. Nombres Bordeaux 7, 1995, 255–282) and "Counting points on elliptic curves on finite fields" (written by R. Schoof, J. Theor. Nombres Bordeaux 7, 1995, 219–254).

(j-Invariant of the Elliptic Curve)

As a parameter of the elliptic curve, there is the j invriant number. The j-invariant of the elliptic curve E: $y^2=x^3+a\times x+b$ is given by an equation below.

$$j=1728\times 4\times a^3/(4\times a^3+27\times x\times b^2)$$

The j-invariant of the elliptic curve E is equal to that of the elliptic curve that is its isomorphism.

(Twist of the Elliptic Curve)

Contrary to the above, when the j-invariants of the elliptic curves E and E' are equal, either E and E' are isomorphic or E' is a twist of E. To the elliptic curve E: $y^2=x^3+a\times x+b$, the elliptic curve Et: $y^2=x^3+a\times c^2\times x+b\times c^3$ given by the element c on the infinite filed F is called a twist of E. As was stated above, the j-invariants of E and Et are equal. In general, the order of E and that of the twist of E are different.

In the steps S304~S308 by the elliptic curve generating unit 210, the elliptic curve $EI_2$ that is the isogeny of degree L is sought, but since the elliptic curve is sought from the j-invariant, there is a possibility that the twist of the sought elliptic curve EI that is the isogeny of degree L is sought. In the step S314, to judge whether the sought elliptic curve EI that is the isogeny of degree L is obtained or not, whether the order of the inputted elliptic curve EI is equal to that of the sought elliptic curve $EI_2$ is checked. Then, in the case that the orders are judged not to be equal, the twist of $y_2=x^3+a_2\times x+b_2$ is calculated.

As is evident from the explanation above, the security of the elliptic curve encryption depends on the order. Therefore, since the present elliptic curve converting device 200 converts the inputted elliptic curve into the isogenous elliptic curve, namely, the elliptic curve whose order is equal, it can be said that the elliptic curve converting device 200 is doing a conversion that holds secure.

Moreover, the conventional elliptic curve converting device according to the above-mentioned Japanese Patent No. 3050313 can convert the inputted elliptic curve into the elliptic curve that satisfies a=−3 only with the probability of 1/4, but the elliptic curve converting device 200 according to the first embodiment searches the isogenous elliptic curves, namely, the extremely many elliptic curves whose orders are equal as its object, and therefore among the elliptic curves whose orders are equal, when there are the elliptic curves with a=−3, they are always convertible.

As was stated above, by the elliptic curve converting device according to the first embodiment, an arbitrary elliptic curve can be converted into the elliptic curve with a=−3, maintaining the security and reducing further the calculation quantity, with extremely high probability.

(The Second Embodiment)

The elliptic curve converting device 400 according to the second embodiment of the present invention is explained.

Figure 7:
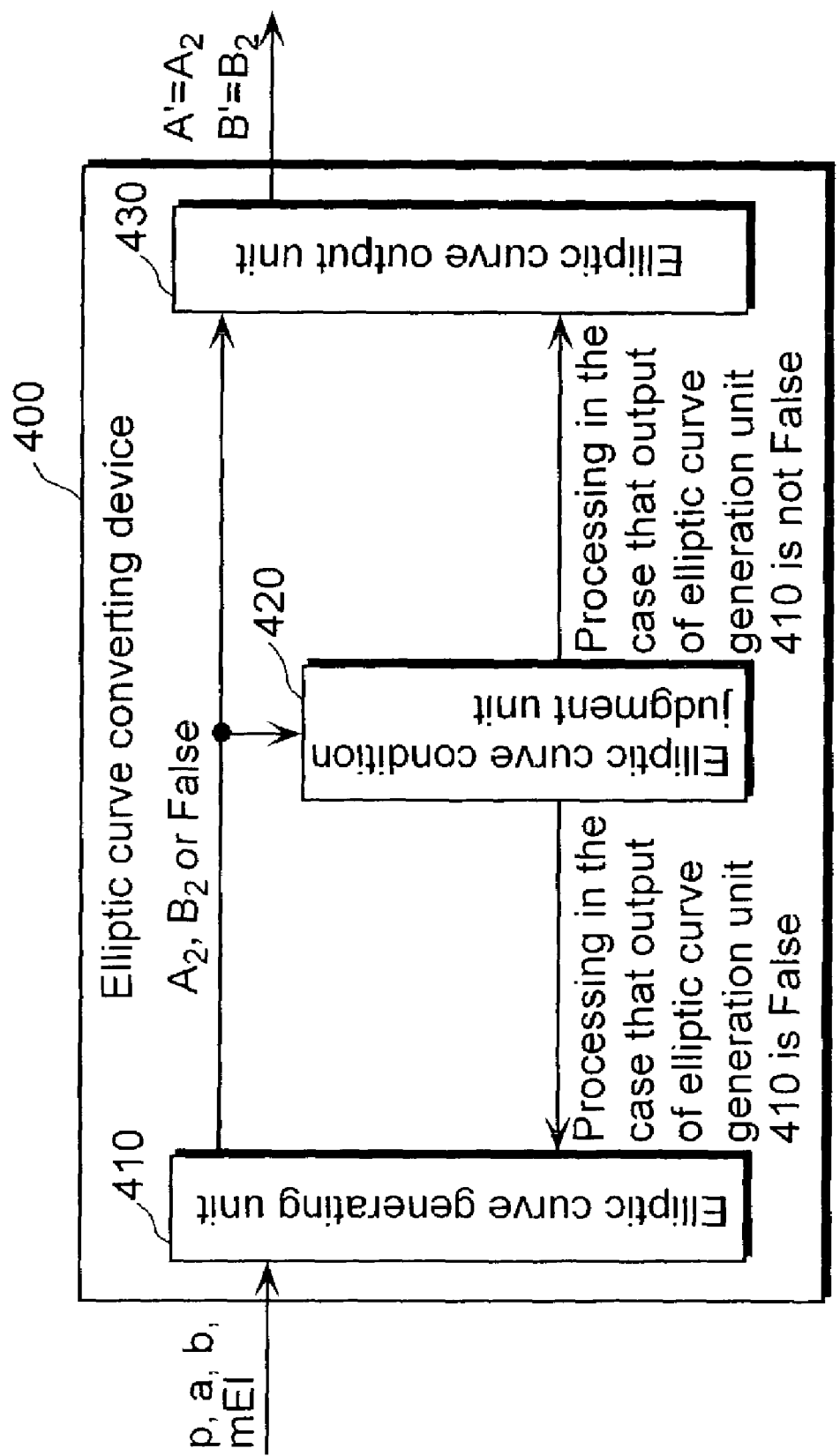
FIG. 7 is a function block diagram that shows the structure of an elliptic curve converting device according to the second embodiment of the present invention.

FIG. 7 is a function block diagram that shows the structure of the elliptic curve converting device 400 according to the second embodiment. The elliptic curve converting device 400 is a device that is realized by a program executed on a computer or an electronic circuit like LSI and so forth and functionally comprises an elliptic curve generating unit 410, an elliptic curve condition judgment unit 420 and an elliptic curve output unit 430. The elliptic curve converting device 400 inputs the parameters p, a, and b of the Weierstrass-type elliptic curve EI: $y^2=x^3+a\times x+b$ on the finite filed GF (p) and the order mEI of the elliptic curve EI and outputs the parameter A' and B' of the Montgomery-type elliptic curve EO: $B'\times y^2=x^3+A'\times x^2+x$ that is isogenous with the elliptic curve EI on GF (p).

The elliptic curve generating unit 410 receives the inputted arbitrary Weierstrass-type elliptic curve, searches the Montgomery-type elliptic curve that is isogenous with the Weierstrass-type elliptic curve, if any, generates the elliptic curve and outputs the generated elliptic curve to the elliptic curve condition judgment unit 420 and the elliptic curve output unit 430. To be more specific, the elliptic curve generating unit 410 inputs the parameters p, a, and b of the Weierstrass-type elliptic curve EI: $y^2=a\times x+b$ and the order mEI of the elliptic curve EI, searches the Montgomery-type elliptic curve $EI_2$: $B_2\times y^2=x^3+A_2\times x^2+x$, outputs $A_2$ and $B_2$ of the elliptic curve in the case of finding one and outputs False in the case of not finding one.

The elliptic curve condition judgment unit 420 judges whether the outputted value from the elliptic curve generating unit 410 is a parameter of an elliptic curve or False, in the case of False, by notifying the elliptic curve generating unit 410 accordingly, has the elliptic curve generating unit 410 generate again another isogenous Montgomery-type elliptic curve. On the other hand, in the case of not False, the elliptic curve condition judgment unit 420 notifies the elliptic curve output unit 430 accordingly.

The elliptic curve output unit 430 outputs, in the case of receiving the notification that the outputted value of the elliptic curve generating unit 410 is not False from the elliptic curve condition judgment unit 420, the parameters $A_2$ and $B_2$ of the elliptic curve $EI_2$: $B_2\times y^2=x^3+A_2\times x^2+x$ outputted from the elliptic curve generating unit 410 as A' and B' to the outside.

Next, the operations of the elliptic curve converting device 400 according to the present embodiment that is constructed as above are explained.

Figure 8:
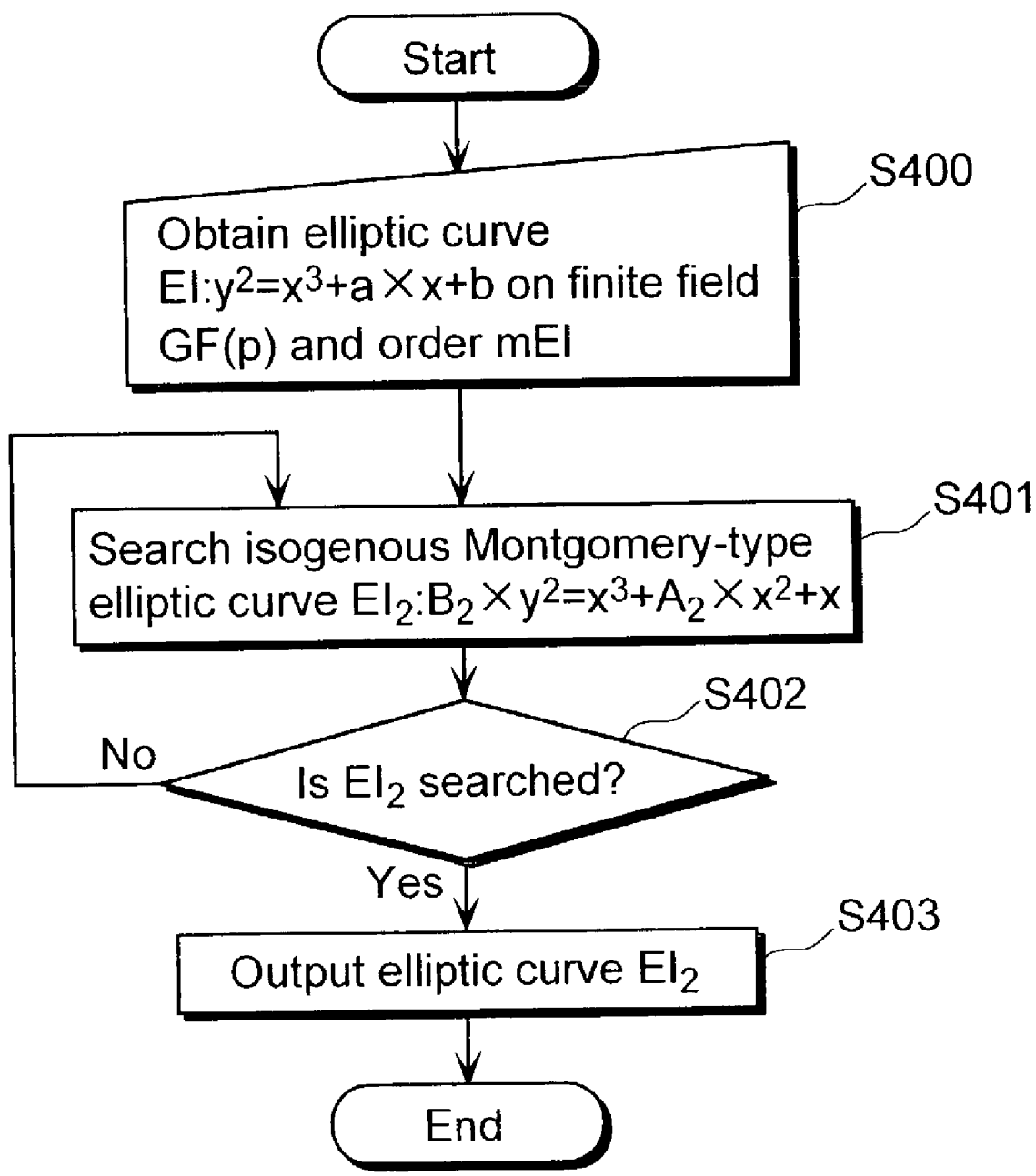
FIG. 8 is a flow chart that shows operations of the elliptic curve converting device.

FIG. 8 is a flow chart that shows the operations of the elliptic curve converting device 400. For a start, the elliptic curve generating unit 410 receives the inputted Weierstrass-type elliptic curve (Step S400), searches the Montgomery-type elliptic curve that is isogenous with the Weierstrass-type elliptic curve (Step S401) and outputs the elliptic curve (the parameters $A_2$ and $B_2$) in the case of finding one, and the result (False) in the case of not finding one to the elliptic curve condition judgment unit 420 and the elliptic curve output unit 430. The elliptic curve condition judgment unit 420 judges whether the Montgomery-type elliptic curve is searched or not, namely, whether the output of the elliptic curve generating unit 410 is False or not (S402), and in the case of not being searched, namely, False (No at Step S402), notifies the elliptic curve generating unit 410 accordingly.

The elliptic curve generating unit 410 that receives the notification repeats the search of another Montgomery-type elliptic curve that is isogenous with the inputted Weierstrass-type elliptic curve (S401~S402). At this point, the elliptic curve generating unit 410 tries to generate another Montgomery-type elliptic curve that is isogenous with the inputted Weierstrass-type elliptic curve by using an isogenous transforming with the different degree from until now (an isogenous transforming of degree L).

On the other hand, in the case of succeeding in the search by the elliptic curve converting device 400 (Yes at Step S402), the elliptic curve condition judgment unit 420 notifies the elliptic curve output unit 430 accordingly. Then, the elliptic curve output unit 430 that receives the notification outputs the parameters $A_2$ and $B_2$ of the Montgomery-type elliptic curve $EI_2$ outputted from the elliptic curve generating unit 410 as A' and B' (Step S403).

Figure 9:
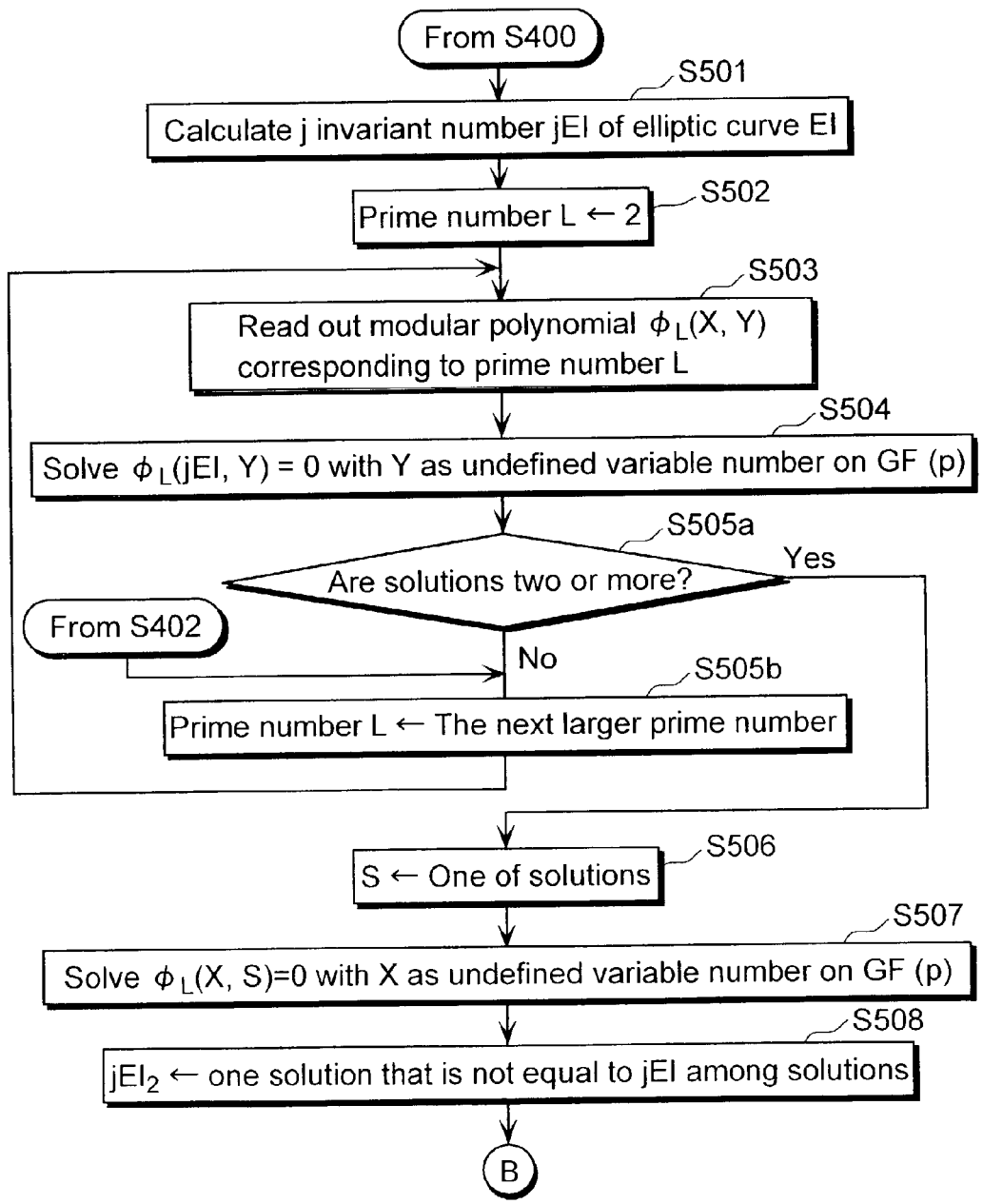
FIG. 9 is the first half of a flow chart that shows detailed procedures of processing of an elliptic curve generating unit (Step S401) in FIG. 8.
Figure 10:
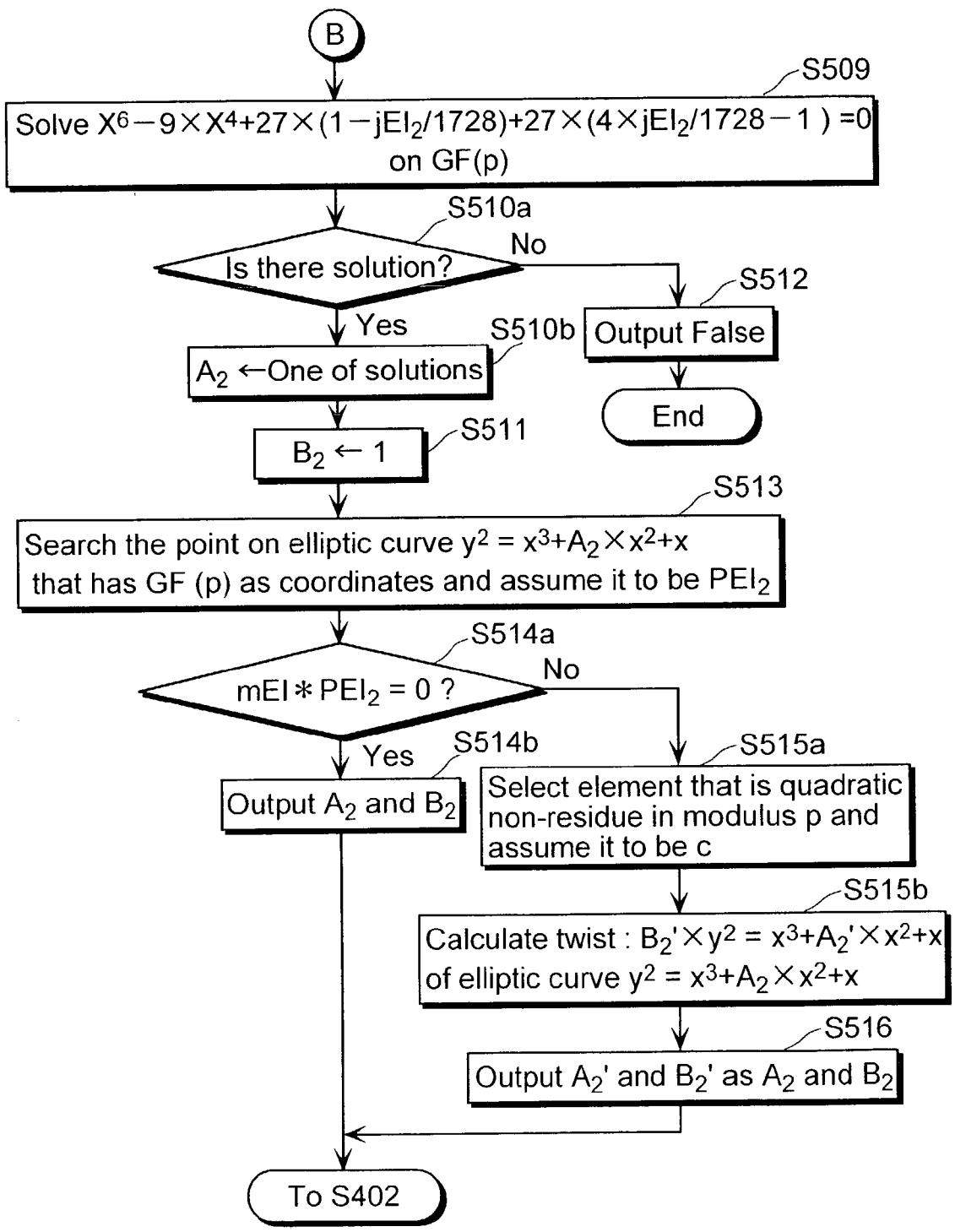
FIG. 10 is the latter half of a flow chart that shows detailed procedures of processing of an elliptic curve generating unit (Step S401) in FIG. 8.

FIG. 9 and FIG. 10 are flow charts that show detailed procedures of processing of an elliptic curve generating unit (Step S401) in FIG. 8.

The elliptic curve generating unit 410, by the procedures described below, from the parameters a and b of the inputted elliptic curve EI: $y^2=x^3+a\times x+b$ and the order mEI of the elliptic curve EI, searches the isogenous Montgomery-type elliptic curve $EI_2$: $B_2\times y^2=x^3+A_2\times x^2+x$, in the case of succeeding the search, outputs the coefficients $A_2$ and $B_2$ and in the case of not succeeding the search, outputs False.

Step S501: By the equation below, seek j-invariant jEI of the elliptic curve EI.

$$jEI=1728\times(4\times a^3+27\times b^2)/(4\times a^3)$$

Step S502: Set the initial value (2) to a prime number L.

Step S503: Read out a modular polynomial $\phi_L$ (X, Y) corresponding to the prime number L.

Step S504: Solve $\phi_L$ (jEI, Y)=0 with Y as an undefined variable number on the finite field GF (p).

Step S505 (S505a, S505b): In the case that there are not two or more solutions, to the prime number L, set the next larger prime number and back to Step S503. Moreover, as for the prime number L, set the value taken out from the sequence of prime numbers that are memorized in advance (2, 3, 5, 7, ... ) in the order from a small number to a large number.

Step S506: Among the above-mentioned solutions, select one, and assume it to be S.

Step S507: Solve $\phi_L$(X, S)=0 with X as an undefined variable number on the finite field GF (p).

Step S508: Take one that is not equal to jEI among the above-mentioned solutions, and assume it to be $jEI_2$.

Step S509: Solve the equation below on the infinite field GF (p).

$$X^6-9\times X^4+27\times(1-jEI_2/1728)+27\times(4\times jEI_2/1728-1)=0$$

Step S510 (Step S510a, S510b): In the case that there are solution(s) to the equation above, advance to Step S511 with one solution as $A_2$. Other than that, advance to Step 512.

Step S511: Assume that $B_2$=1. Advance to Step S513.

Step S512: Output False and finish.

Step S513: Search the point on the elliptic curve $y^2=x^3+A_2\times x^2+x$ that has GF (p) as coordinates and assume it to be $PEI_2$.

Step S514 (S514a, S514b): Judge whether $eMI*PEI_2=O$ satisfies or not. Here, O is the zero element of $EI_2$. In the case of satisfying, output $A_2$ and $B_2$ and finish. Other than that, advance to Step S515.

Step S515 (S515a, S515b): Select an element that is a quadratic non-residue in the modulus p and assume it to be c. Seek the twist: $B_2'\times y^2=x^3+A_2'\times x^2+x$ of the elliptic curve $y^2=x^3+A_2\times x^2+x$ from the equations below.

$$A_2'=A_2$$

$$B_2'=c^3$$

Step S516: Output $A_2'$ and $B_2'$ as $A_2$ and $B_2$ and finish.

Moreover, the elliptic curve generating unit 410, in the case of receiving an notification that output of the elliptic curve generating unit 410 is False from the elliptic curve condition judgment unit 420, sets the next larger prime number of the proximate prime number L as the prime number L (Step S505b), and then repeats the above-mentioned processing starting from S503.

As just described, since the elliptic curve converting device 400 converts the inputted elliptic curve into the isogenous elliptic curve, namely, the elliptic curve whose order is equal, it can be said that the elliptic curve converting device 400 is doing a conversion that holds safety.

Here, the converting method in the case of converting the inputted Weierstrass-type elliptic curve into the isomorphic Montgomery-type elliptic curve based on the same thinking as the conventional elliptic curve converting device according to the above-mentioned Patent No. 3050313 is compared with the converting method according to the present embodiment. The conventional elliptic curve converting device can convert the inputted elliptic curve into the Montgomery-type elliptic curve only with the probability of 19/48. On the other hand, the elliptic curve converting device 400 converts into the isogenous elliptic curve, namely, the elliptic curve whose order is equal, and therefore when there are the Montgomery-type elliptic curve(s) among the elliptic curves whose orders are equal, it is (they are) always convertible.

Consequently, by the elliptic curve converting device according to the present embodiment, an arbitrary Weierstrass-type elliptic curve can be converted into the Montgomery-type elliptic curve, maintaining the security and reducing further the calculation quantity, with extremely high probability.

Figure 11A:
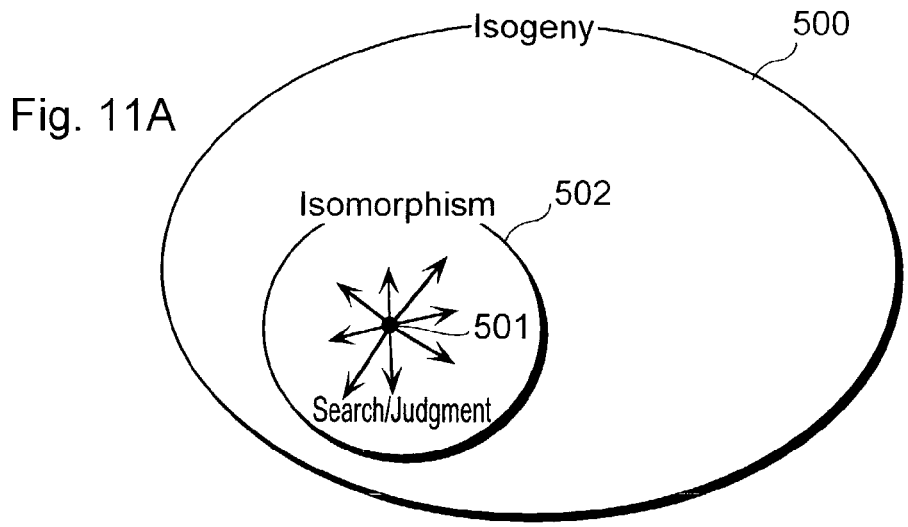
FIG. 11A is a diagram that shows the search method of an elliptic curve by the conventional elliptic curve converting device.
Figure 11B:
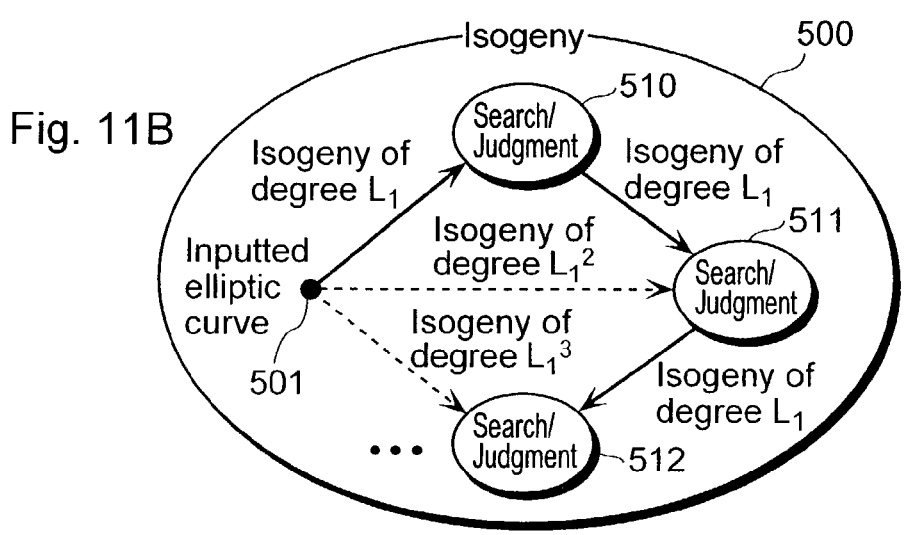
FIG. 11B is a diagram that shows the search method of an elliptic curve by the elliptic curve converting device according to the first embodiment of the present invention.
Figure 11C:
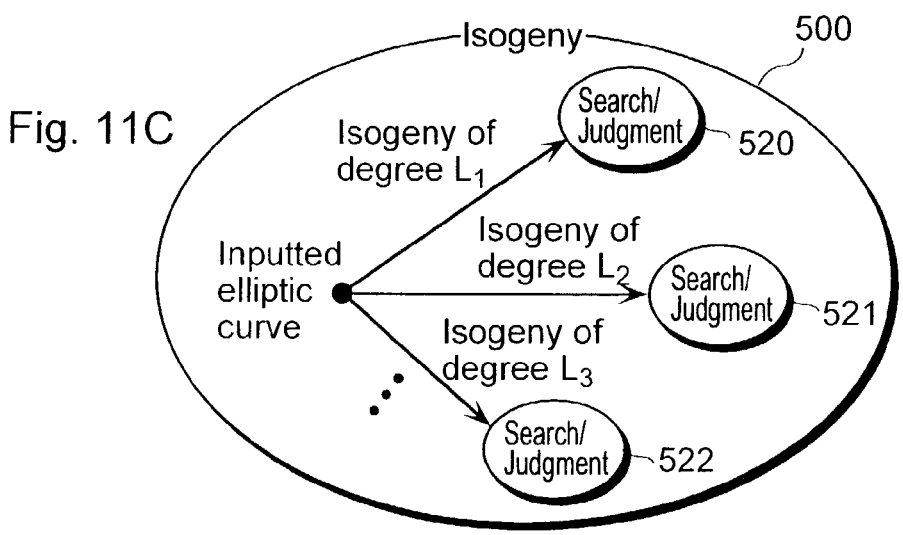
FIG. 11C is a diagram that shows the search method of a elliptic curve by the elliptic curve converting device according to the second embodiment of the present invention.

Next, explanation is given by contrasting the fundamental algorithm of the present invention that is common to the first and second embodiments with that of the conventional elliptic curve converting device according to the above-mentioned Patent No. 3050313. FIG. 11A is a diagram that shows the search method of an elliptic curve by the conventional elliptic curve converting device; FIG. 11B is a diagram that shows the search method of an elliptic curve by the elliptic curve converting device 200 according to the first embodiment; and FIG. 11C is the diagram that shows a search method of an elliptic curve by the elliptic curve converting device 400 according to the second embodiment. Moreover, in these figures, the large frame 500 that is placed outside shows the set of the elliptic curves that are isogenous with the elliptic curves inputted into the elliptic curve converting device; the black dot shows the elliptic curve inputted into the elliptic curve converting device; the frame 502 shows the set of the elliptic curves that are isomorphic with the elliptic curve 501; and the frames 510~512 and 520~522 show the sets that have the relationship of the isogeny of degree L with the inputted elliptic curve 501 as shown in FIG. 11B and FIG. 11C.

As shown in FIG. 11A, the conventional elliptic curve converting device searches the elliptic curves that satisfy a certain condition ($a_2$=−3) among the group of the elliptic curves 502 that is isomorphic with the inputted elliptic curve 501. On the other hand, the elliptic curve converting device 200 according to the first embodiment of the present invention searches, as shown in FIG. 11B, the elliptic curve that satisfies the speeding-up condition for calculation, namely, $a_2$=−3, among the group of the elliptic curves 510 that is the isogeny of degree $L_1$ with the inputted elliptic curve 501. In the case of being unable to find one, the elliptic curve converting device 200 searches among the group of the elliptic curves 511 that is further isogenous of degree $L_1$ with the group of the isogenous elliptic curves of degree $L_1$ 510 (namely, the group of the isogenous elliptic curves of degree $L_1^2$ with the elliptic curve 501) and repeats the search in the range of the isogenous elliptic curves.

Consequently, being different from the conventional elliptic curve converting device that searches the group of the target elliptic curves that belong to the narrow range of the isomorphisms as its object, since the elliptic curve converting device 200 according to the first embodiment searches the group of the target elliptic curves that belong to the wider range of the isogenies as its object, can search and generate the target elliptic curves with the probability of 100% as long as the target elliptic curves exist among the group of the isogenous elliptic curves.

Moreover, the elliptic curve 510 is produced by performing the isogenous transforming of degree L against the inputted elliptic curve 501. The elliptic curve 511 that is produced by performing again the isogenous transforming of degree L against the elliptic curve 510 becomes equal to performing the isogenous transforming of degree $L_1^2$ against the original elliptic curve 501.

Moreover, as shown in FIG. 11C, the elliptic curve converting device 400 according to the second embodiment of the present invention searches the elliptic curve that satisfies the speeding-up condition, namely, the Montgomery-type curve, among the group of the elliptic curves 520 that is the isogeny of degree $L_1$ with the inputted elliptic curve 501. In the case of being unable to find one, this time, the elliptic curve converting device 400 searches the inputted elliptic curve 501 among the group of the isogenous elliptic curves of degree $L_2$, and repeats the search in the range of the group of the isogenous elliptic curves 500.

Consequently, being different from the conventional elliptic curve converting device that searches the group of the target elliptic curves that belong to the narrow range of the isomorphisms as its object, since the elliptic curve converting device 400 according to the second embodiment searches the group of the target elliptic curves that belong to the wider range of the isogeny as its object, can search and generate the target elliptic curves with the probability of 100% as long as the target elliptic curves exist among the group of the isogenous elliptic curves.

Up to this point, the elliptic curve converting device according to the present invention, based on the two embodiments, is explained, but as a matter of course the present invention is not limited to these embodiments.

For example, in the second embodiment, the isogenous transforming that is shown in FIG. 11C is used, but it is acceptable to use the isogenous transforming that is shown in FIG. 11B. In other words, the search is not repeated with the once generated elliptic curve as the newly inputted elliptic curve, it is acceptable to search by repeating a different isogenous transforming against the elliptic curve that is inputted first.

Additionally, it is acceptable that the judgment condition at Steps S305 and S505 by the elliptic curve generating units 210 and 410 is "the number of the solutions is two". Furthermore, at this time, it is acceptable that at Steps S305 and S505, after it is judged that "the number of the solutions is two" at Steps S305a and S505a, respectively, the value of L at that time is set. In other words, at Steps S305a and S505a, in the case of being judged that "the number of the solutions is two or more", since it is guaranteed that the isogenous transformation by the L at that time (isogeny of degree L) can be repeated (the elliptic curve after the transforming surely exists), it is possible to repeat the isogenous transforming of degree L with the same degree (L) as shown in FIG. 11B

Moreover, the present invention can be realized an elliptic curve utilization device that uses the elliptic curve obtained by the above-explained elliptic curve converting device. The specific examples of the elliptic curve utilization device are a cipher communication system that is composed of an encryption device and a decryption device, a digital signature system that is composed of a digital signature device and a digital signature verification device, a key-sharing system in which two devices try to share a secret key by verifying the authenticity of the other party mutually, and so forth.

Figure 12:
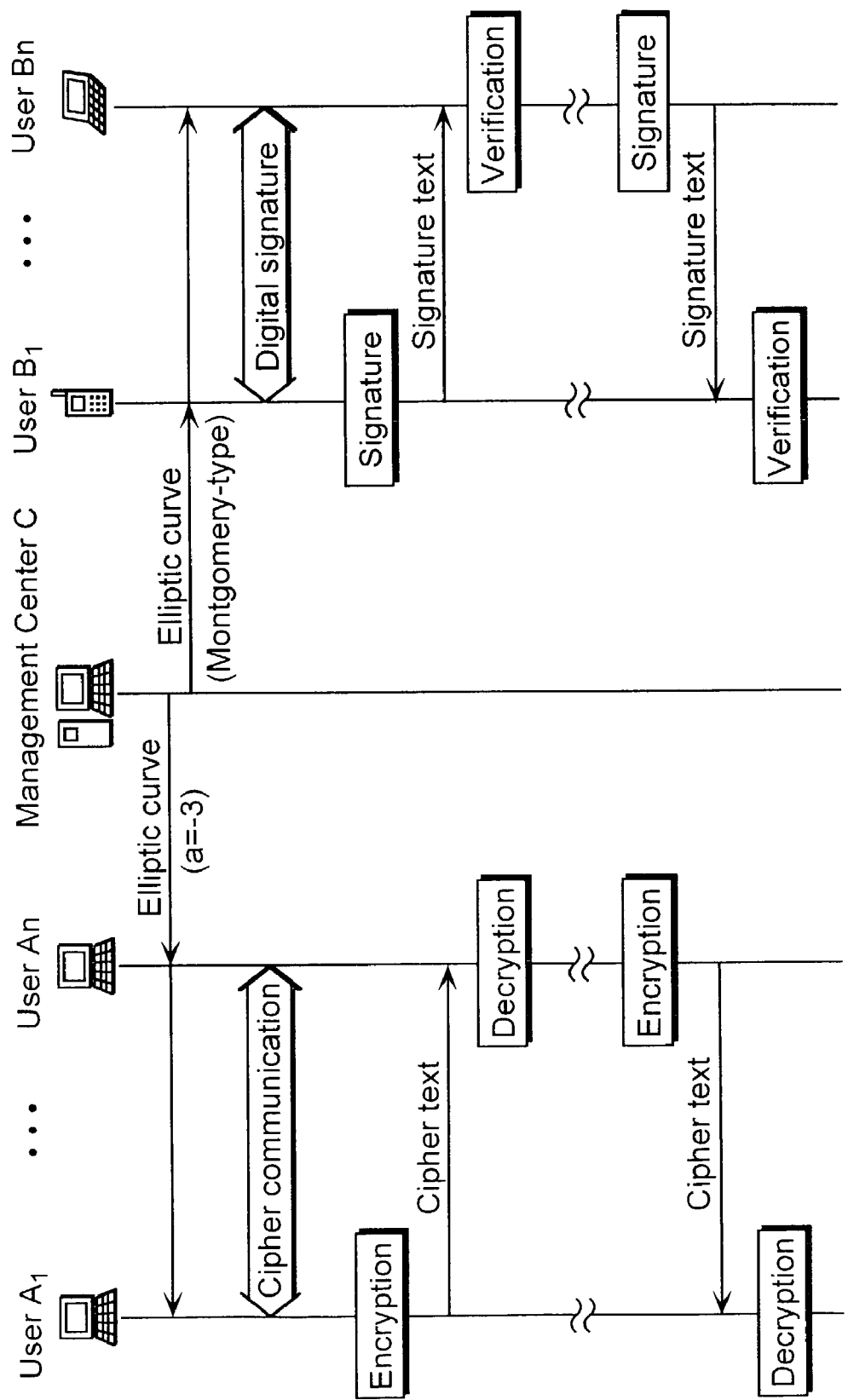
FIG. 12 is a sequence diagram of communication system that shows an application example of an elliptic curve converting device according to the present invention.

For example, like an applied example of the present invention that is shown in FIG. 12, Management Center C that is equipped with the elliptic curve converting device according to the present invention generates the elliptic curve (for example, the elliptic curve with $a_2=-3$) that is used in the cipher communication system and provides the users A1~An, or generates the elliptic curve (for example, the Montgomery-type elliptic curve) that is used in the digital signature system and provides the users B1~Bn.

Then, to ensure the security, for example, when a certain period has passed, it is acceptable that the Management Center C generates a new elliptic curve by using the elliptic curve converting device according to the present invention, provides the users A1~An and B1~Bn with the new elliptic curve and updates the elliptic curve that is used in the cipher communication system and the digital signature system. Additionally, it is acceptable that the devices of the users A1~An inform the elliptic curve converting device of the Management Center C about the parameters (p, a, b, mEI) that are used up to the time and that the Management Center C inputs the parameters, generates a new elliptic curve and returns the new elliptic curve to the users A1~An. Then, the devices of the user A1~An have cipher communication by using the new elliptic curve that the elliptic curve converting device of the Management Center C returns. By doing this, the cipher system with high security in which the elliptic curve as the base of encryption is updated dynamically is realized.

Moreover, it is acceptable that the present invention is an elliptic curve generating device that is equipped with the above-described elliptic curve converting device and generates parameters of the safe elliptic curve. For example, by creating an inputted parameter generating unit that generates a set of the inputted parameters to the elliptic curve converting device according to the above-mentioned embodiment in a certain procedure, holds plural sets of inputted parameters in advance and outputs the plural sets in succession to the elliptic curve converting device, it is possible to realize the elliptic curve generating device that is composed of the inputted parameter generating unit and the elliptic curve converting device.

Additionally, the elliptic curve converting device assumes that the condition of the elliptic curve is to satisfy $a=-3$ or to be a Montgomery-type elliptic curve but any conditions that have the possibility to satisfy these conditions, in other words, any speeding-up conditions that reduce the calculation quantity of arithmetic on the elliptic curve will do.

Moreover, in the elliptic curve converting device according to the above-mentioned embodiments, in the case that the elliptic curve condition judgment unit judges that a certain condition of the elliptic curve is not satisfied, the processing of the elliptic curve generating unit is repeated but it is acceptable that the repeated processing like this is not done and nothing is outputted. Additionally, it is acceptable to repeat within the limit up to a certain number of times. By doing this, it is possible to convert the elliptic curves within the limited amount of time.

Moreover, the present invention can be realized as an elliptic curve converting method with the characteristic components that the elliptic curve converting device provides as steps.

As was explained above, by the present invention, against the inputted Weierstrass-type elliptic curve, as long as there are the elliptic curve that satisfies $a=-3$ or the Montgomery-type elliptic curve exists among the isogenous elliptic curves with the inputted Weierstrass-type elliptic curve, it is possible to convert the inputted Weierstrass-type elliptic curve into the elliptic curve that satisfies $a=-3$ or is the Montgomery-type elliptic curve. Consequently, it becomes easier to generate the elliptic curve whose calculation quantity is further reduced without loss of security. The elliptic curve like this is suitbale for the cipher communication system, the digital signature system or the key-sharing system that use the elliptic curve, and especially suitable for the system that adopts the plural elliptic curves and the system that alters the elliptic curves dynamically. Therefore, its practical value as the fundamental technology for electronic settlement and secret communication that require high security and the protection of the digital literary works is extremely high.

What is claimed is:

1. An elliptic curve converting device that converts a first elliptic curve defined on a finite field F into a second elliptic curve defined on the finite field F, the elliptic curve converting device comprising:
    a search unit operable to search for an elliptic curve that satisfies a speeding-up condition that reduces a calculation quantity of arithmetic on the elliptic curve from among a group of isogenous elliptic curves of degree $L_1$, the group of isogenous elliptic curves of degree $L_1$ being a group of elliptic curves having the same order as the first elliptic curve and a relationship with the first elliptic curve;
    a judgment unit operable to judge whether or not an elliptic curve that satisfies the speeding-up condition was searched by the search unit; and
    an output unit operable to output, if the judgment unit judges that an elliptic curve that satisfies the speeding-up condition was searched by the search unit, the elliptic curve judged by the judgment unit as satisfying the speeding-up condition as the second elliptic curve.

2. The elliptic curve converting device according to claim 1,
    wherein the search unit is operable to identify the group of isogenous elliptic curves of degree $L_1$ using a j-invariant of the first elliptic curve and a modular polynomial that corresponds to a prime number L.

3. The elliptic curve converting device according to claim 2, wherein the search unit includes:
    a j-invariant calculating unit operable to calculate the j-invariant of the first elliptic curve;
    a prime number generating unit operable to generate a prime number L;
    a polynomial generating unit operable to generate a modular polynomial $\phi(X, Y)$ that is calculable from the generated prime number L;
    an equation generating unit operable to generate an equation from the generated modular polynomial $\phi(X, Y)$ and the j-invariant;
    an equation solution calculating unit operable to calculate a solution of the generated equation defined on the infinite field F;
    a solution judgment unit operable to judge whether the number of the calculated solutions satisfies a predetermined condition; and
    a control unit operable to control the prime number generating unit to generate a prime number; the polynomial generating unit to generate a polynomial; the equation generating unit to generate an equation; the equation solution calculating unit to calculate a solution; and the solution judgment unit to judge the number of solutions until the number of solutions satisfies the predetermined condition.

4. The elliptic curve converting device according to claim 3,
    wherein the prime number generating unit is operable to generate prime numbers in succession from a small prime number.

5. The elliptic curve converting device according to claim 3,
    wherein the search unit is operable to search for an elliptic curve using the same prime number without having the prime number generating unit generate a new prime number after the number of the solutions satisfies the predetermined condition.

6. The elliptic curve converting device according to claim 1, wherein the search unit is operable to repeat the search the elliptic curve that satisfies the speeding-up condition if the judgment unit judges that the elliptic curve that satisfies the speeding-up condition was not searched by the search unit.

7. The elliptic curve converting device according to claim 6,
    wherein the search unit is operable to search for the elliptic curve that satisfies the speeding-up condition among a group of elliptic curves that is isogenous of degree $L_2$ with the first elliptic curve if the judgment unit judges that the elliptic curve that satisfies the speeding-up condition was not searched by the search unit.

8. The elliptic curve converting device according to claim 7,
    wherein the search unit is operable to identify the group of isogenous elliptic curves of degree $L_1$ using the j invariant number of the first elliptic curve and the modular polynomial that corresponds to the prime number L, and if the judgment unit judges that the elliptic curve that satisfies the speeding-up condition was not searched by the search unit, the search unit identifies the elliptic curve that is isogenous of degree $L_2$ by replacing the prime number L with another prime number.

9. The elliptic curve converting device according to claim 6,
    wherein the search unit is operable to identify a tentative elliptic curve that is a candidate of the elliptic curve that satisfies the speeding-up condition that reduces calculation quantity of arithmetic on the elliptic curve among the group of isogenous elliptic curves of degree $L_1$,
    wherein the judgment unit is operable to judge whether or not the tentative elliptic curve identified by the search unit satisfies the speeding-up condition, and
    wherein the search unit is operable to, if the judgment unit judges that the tentative elliptic curve does not satisfy the speeding-up condition, make the tentative elliptic curve the new first elliptic curve, and search for the elliptic curve that satisfies the speeding-up condition that reduces the calculation quantity of arithmetic on the elliptic curve from among the group of isogenous elliptic curves of degree $L_1$.

10. The elliptic curve converting device according to claim 9,
    wherein the search unit is operable to identify the group of isogenous elliptic curves of degree $L_1$ using the j invariant number of the first elliptic curve and the modular polynomial that corresponds to the prime number L, and if the judgment unit judges that the elliptic curve that satisfies the speeding-up condition was not searched by the search unit, the search unit searches for the isogenous elliptic curve of degree $L_1$ using the same prime number.

11. The elliptic curve converting device according to claim 1,
    wherein the speeding-up condition is "a=−3" on the equation $y^2=x^3+a\times x+b$.

12. The elliptic curve converting device according to claim 1,
wherein the speeding-up condition is that the elliptic curve is a Montgomery-type elliptic curve.

13. An elliptic curve converting method for converting a first elliptic curve defined on a finite field F into a second elliptic curve defined on the finite field F, the elliptic curve converting method comprising:
a search step of searching for an elliptic curve that satisfies a speeding-up condition that reduces a calculation quantity of arithmetic on the elliptic curve from among a group of isogenous elliptic curves of degree $L_1$, group of isogenous elliptic curves of degree $L_1$ being a group of elliptic curves having the same order as the first elliptic curve and a relationship with the first elliptic curve;
a judgment step of judging whether or not an elliptic curve that satisfies the speeding-up condition was searched in the search step; and
an output step of outputting, if the judgment step judges that an elliptic curve that satisfies the speeding-up condition was searched in the search step, the elliptic curve judged in the judgment step as satisfying the speeding-up condition as the second elliptic curve.

14. The elliptic curve converting method according to claim 13,
wherein the search step comprises repeating the search for the elliptic curve that satisfies the speeding-up condition if the judgment step judges that the elliptic curve that satisfies the speeding-up condition was not searched in the search step.

15. The elliptic curve converting method according to claim 14,
wherein the search step comprises searching for the elliptic curve that satisfies the speeding-up condition among a group of elliptic curves that is isogenous of degree $L_2$ with the first elliptic curve that if the judgment step judges that the elliptic curve that satisfies the speeding-up condition is was not searched in the search step.

16. The elliptic curve converting method according to claim 14,
wherein the search step comprises identifying a tentative elliptic curve that is a candidate of the elliptic curve that satisfies the speeding-up condition that reduces the calculation quantity of arithmetic on the elliptic curve among the group of isogenous elliptic curves of degree $L_1$,
wherein the judgment step comprises judging whether or not the tentative elliptic curve identified in the search step satisfies the speeding-up condition, and
wherein the search step comprises, if the judgment step judges that the tentative elliptic curve does not satisfy the speeding-up condition, making the tentative elliptic curve the new first elliptic curve, and searching for the elliptic curve that satisfies the speeding-up condition that reduces the calculation quantity of arithmetic on the elliptic curve from among the group of isogenous elliptic curves of degree $L_1$.

17. An elliptic curve converting program stored on a computer readable medium for converting a first elliptic curve defined on a finite field F into a second elliptic curve defined on the finite field F, the elliptic curve converting program causing a computer to execute a method comprising:
a search step of searching for an elliptic curve that satisfies a speeding-up condition that reduces calculation quantity of arithmetic on the elliptic curve from among a group of isogenous elliptic curves of degree $L_1$, the group of isogenous elliptic curves of degree $L_1$ being a group of elliptic curves having the same order as the first elliptic curve and a relationship with the first elliptic curve;
a judgment step of judging whether or not an elliptic curve that satisfies the speeding-up condition was searched in the search step; and
an output step of outputting, if the judgment step judges that an elliptic curve that satisfies the speeding-up condition was searched in the search step, the elliptic curve judged in the judgment step as satisfying the speeding-up condition as the second elliptic curve.

18. An elliptic curve utilization device that uses an elliptic curve obtained by an elliptic curve converting device, the elliptic curve utilization device comprising:
a memorizing unit operable to memorize a parameter that identifies the elliptic curve; and
a utilization unit operable to execute encryption, decryption, a digital signature, digital signature verification or key-sharing using an elliptic curve defined on a finite field F and the parameter memorized by the memorizing unit,
wherein the elliptic curve converting device that converts a first elliptic curve defined on a finite field F into a second elliptic curve defined on the finite field F comprises:
a search unit operable to search for an elliptic curve that satisfies a speeding-up condition that reduces a calculation quantity of arithmetic on the elliptic curve from among a group of isogenous elliptic curves of degree $L_1$, the group of isogenous elliptic curves of degree $L_1$ being a group of elliptic curves having the same order as the first elliptic curve and a relationship with the first elliptic curve;
a judgment unit operable to judge whether or not an elliptic curve that satisfies the speeding-up condition was searched by the search unit; and
an output unit operable to output, if the judgment unit judges that an elliptic curve that satisfies the speeding-up condition was searched by the search unit, the elliptic curve judged by the judgment unit as satisfying the speeding-up condition as the second elliptic curve.

19. The elliptic curve utilization device according to claim 18, further including:
a parameter transmission unit operable to have the elliptic curve converting device generate a new elliptic curve by transmitting the parameter memorized in the memorizing unit to the elliptic curve converting device; and
a parameter updating unit operable to update contents of the memorizing unit using a parameter that identifies an elliptic curve generated by the elliptic curve converting device.

20. An elliptic curve generating device that generates an elliptic curve defined on an infinite field F, the elliptic curve generating device comprising:
a generating unit operable to generate a first elliptic curve defined on the infinite field F;
a search unit operable to search for an elliptic curve that satisfies a speeding-up condition that reduces a calculation quantity of arithmetic on the elliptic curve among a group of isogenous elliptic curves of degree $L_1$, the group of isogenous elliptic curves of degree $L_1$ being a group of elliptic curves having the same order as the first elliptic curve and a relationship with the first elliptic curve;

a judgment unit operable to judge whether or not an the elliptic curve that satisfies the speeding-up condition was searched by the search unit; and an output unit operable to output, if the judgment unit judges that an elliptic curve that satisfies the speeding-up condition was searched by the search unit, the elliptic curve judged by the judgment unit as satisfying the speeding-up condition as the second elliptic curve.

21. The elliptic curve generating device according to claim 20, wherein the search unit repeats the search for the elliptic curve that satisfies the speeding-up condition if the judgment unit judges that the elliptic curve that satisfies the speeding-up condition was not searched by the search unit.

22. The elliptic curve generating device according to claim 20,
wherein the speeding-up condition is "a=−3" on the equation $y^2=x^3+a \times x+b$.

23. The elliptic curve generating device according to claim 20,
wherein the speeding-up condition is that the elliptic curve is a Montgomery-type elliptic curve.

* * * * *

UNITED STATES PATENT AND TRADEMARK OFFICE
CERTIFICATE OF CORRECTION

| | |
|---|---|
| PATENT NO. | : 7,209,555 B2 |
| APPLICATION NO. | : 10/278914 |
| DATED | : April 24, 2007 |
| INVENTOR(S) | : Yuichi Futa et al. |

Page 1 of 1

It is certified that error appears in the above-identified patent and that said Letters Patent is hereby corrected as shown below:

Column 23,
Line 13, "$L_1$, group" should read --$L_1$, the group--.
Line 37, "curve that if" should read --curve if--.
Line 39, "condition is was not" should read --condition was not--.

Column 25,
Line 4, "or not an the" should read --or not an--.

Signed and Sealed this

Seventh Day of August, 2007

JON W. DUDAS
*Director of the United States Patent and Trademark Office*